(12) United States Patent
Seok et al.

(10) Patent No.: US 12,105,661 B2
(45) Date of Patent: Oct. 1, 2024

(54) ELECTRONIC DEVICE INCLUDING A PLURALITY OF POWER MANAGEMENT INTEGRATED CIRCUITS AND METHOD OF OPERATING THE SAME

(71) Applicant: SAMSUNG ELECTRONICS CO., LTD., Suwon-si (KR)

(72) Inventors: Minshik Seok, Hwaseong-si (KR); Siyoung Ok, Gwangmyeong-si (KR); Jaekyu Jang, Hwaseong-si (KR); Seungjae Lee, Suwon-si (KR); Younghoon Lee, Seoul (KR); Jeehye Lee, Seongnam-si (KR); Sangjoo Jun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 17/843,245

(22) Filed: Jun. 17, 2022

(65) Prior Publication Data
US 2023/0019075 A1 Jan. 19, 2023

(30) Foreign Application Priority Data
Jul. 19, 2021 (KR) .................. 10-2021-0094481

(51) Int. Cl.
*G06F 13/42* (2006.01)
*G06F 1/30* (2006.01)
*G06F 9/4401* (2018.01)

(52) U.S. Cl.
CPC ............ *G06F 13/4208* (2013.01); *G06F 1/30* (2013.01); *G06F 9/4405* (2013.01)

(58) Field of Classification Search
CPC ....... G06F 13/4208; G06F 1/30; G06F 9/4405
See application file for complete search history.

(56) References Cited

U.S. PATENT DOCUMENTS

| 8,612,779 B2 * | 12/2013 | More | G06F 1/3203 |
| | | | 713/320 |
| 9,973,431 B2 | 5/2018 | Mishra et al. | |
| 10,467,154 B2 | 11/2019 | Mishra et al. | |
| 10,523,122 B2 | 12/2019 | Han et al. | |
| 10,838,898 B2 | 11/2020 | Mishra et al. | |

(Continued)

FOREIGN PATENT DOCUMENTS

JP 2013-089060 A 5/2013

*Primary Examiner* — Henry Tsai
*Assistant Examiner* — Christopher A Daley
(74) *Attorney, Agent, or Firm* — Sughrue Mion, PLLC

(57) ABSTRACT

An electronic device is provided. The electronic device includes a first power management integrated circuit (PMIC) with a first fault controller connected to a first node and a first interface circuit connected to a second node; a second PMIC with a second fault controller connected to the first node and a second interface circuit connected to the second node; and a third PMIC with a third fault controller connected to the first node and a third interface circuit connected to the second node. The first fault controller is configured to, during a power on sequence or a power off sequence, detect a change in a voltage level of the first node. The first interface circuit is configured to communicate with any one or any combination of the second interface circuit and communication and the third interface circuit based on the change in the voltage level of the first node.

20 Claims, 16 Drawing Sheets

(56) References Cited

U.S. PATENT DOCUMENTS

| | | | |
|---|---|---|---|
| 10,936,049 B2* | 3/2021 | Mocanu | G06F 3/0604 |
| 11,334,512 B1* | 5/2022 | Tripathy | G06F 21/81 |
| 11,669,145 B2* | 6/2023 | Searles | G06F 1/26 |
| | | | 713/300 |
| 11,671,094 B1* | 6/2023 | Shinde | H03K 19/00361 |
| | | | 327/109 |
| 2016/0357245 A1* | 12/2016 | Heo | G06F 1/26 |
| 2018/0267591 A1* | 9/2018 | Kurian | G06F 1/3212 |
| 2019/0064910 A1* | 2/2019 | Wang | G06F 1/3206 |
| 2020/0042750 A1* | 2/2020 | Chun | G06F 21/81 |
| 2020/0242066 A1 | 7/2020 | Lee et al. | |
| 2021/0271276 A1* | 9/2021 | Seok | G06F 1/26 |
| 2022/0413593 A1* | 12/2022 | Kakkireni | G06F 1/3296 |
| 2023/0408846 A1* | 12/2023 | Nalianya | G02C 7/083 |

\* cited by examiner

FIG. 8A

| Boot Count Value | Device Number | Counting Value |
|---|---|---|
| 1 | DC-DC Converter 1 | 1 |
| 2 | DC-DC Converter 2 | 2 |
| ⋮ | ⋮ | ⋮ |
| m | DC-DC Converter m | m |
| m+1 | Regulator 1 | m+1 |
| m+2 | Regulator 2 | m+2 |
| ⋮ | ⋮ | ⋮ |
| m+n | Regulator n | m+n |

FIG. 8B

| Boot Count Value | Device Number | Counting Value |
|---|---|---|
| 1 | DC-DC Converter 1 | 1 |
| 2 | DC-DC Converter 2 | 2 |
| ⋮ | ⋮ | ⋮ |
| m | DC-DC Converter m | m |
| m+1 | Regulator 1 | m |
| m+2 | Regulator 2 | m+1 |
| ⋮ | ⋮ | ⋮ |
| m+n | Regulator n | m+(n-1) |

ELECTRONIC DEVICE INCLUDING A PLURALITY OF POWER MANAGEMENT INTEGRATED CIRCUITS AND METHOD OF OPERATING THE SAME

CROSS-REFERENCE TO RELATED APPLICATIONS

This application claims priority to Korean Patent Application No. 10-2021-0094481, filed on Jul. 19, 2021, in the Korean Intellectual Property Office, the disclosure of which is incorporated by reference herein in its entirety.

BACKGROUND

The present disclosure relates to an electronic device, and more particularly, to an electronic device including a plurality of power management integrated circuits (PMICs) and an operating method thereof.

Various types of electronic devices, such as a smartphone and a tablet, are currently being used. An electronic device performs various functions depending on operations of various components included in the electronic device. To this end, the electronic device includes circuits, such as a regulator and a direct current (DC)-DC converter, which provide voltages of various values.

In the case where an electronic device includes one power management integrated circuit, voltages of various values are provided to various components of the electronic device under control of the one power management integrated circuit. However, due to high integration and miniaturization of the electronic device, a plurality of power management integrated circuits are used to supply voltages to the components of the electronic device more efficiently. In this case, there is a need to synchronize the power management integrated circuits for a stable voltage supply.

A pin dedicated for the power management integrated circuits may be used for communication between the power management integrated circuits for synchronization. In this case, however, the use of the dedicated pin causes an increase in size and power loss.

SUMMARY

One or more example embodiments provide stable voltages to an electronic device including a plurality of power management integrated circuits, by synchronizing power rails of the plurality of power management integrated circuits by using SPMI communication during an operation of the electronic device.

According to an example embodiment, an electronic device includes a first power management integrated circuit (PMIC) with a first fault controller connected to a first node and a first interface circuit connected to a second node; a second PMIC with a second fault controller connected to the first node and a second interface circuit connected to the second node; and a third PMIC with a third fault controller connected to the first node and a third interface circuit connected to the second node. The first fault controller is configured to, during a power on sequence or a power off sequence, detect a change in a voltage level of the first node, and the first interface circuit is configured to communicate with any one or any combination of the second interface circuit and the third interface circuit based on the change in the voltage level of the first node.

According to an example embodiment, an electronic device includes a first PMIC with a first fault controller connected to a first node and a first interface circuit connected to a second node; a second PMIC with a second fault controller connected to the first node and a second interface circuit connected to the second node; and a main processor with a main interface circuit connected to the first node. The first interface circuit is configured to, during a power on sequence or a power off sequence, communicate with the second interface circuit, and the main interface circuit is configured to, in a period between the power on sequence and the power off sequence, communicate with the first interface circuit and the second interface circuit.

According to an example embodiment, a method of operating an electronic device which includes a first PMIC connected to a node, a second PMIC connected to the node, and a main processor connected to the node, is provided. The method includes: checking, by the first PMIC, a voltage level of the node; communicating, by the first PMIC, with the second PMIC based on a change in the voltage level of the node, the communicating being based on a system power management interface (SPMI) protocol; and sequentially powering on first power rails of the first PMIC and second power rails of the second PMIC based on the communicating.

BRIEF DESCRIPTION OF THE FIGURES

The above and other aspects, features and advantages will become apparent from the following description, taken in conjunction with the accompanying drawings.

FIGS. 8A and 8B illustrate tables associated with a boot count in a power on sequence according to an example embodiment.

DETAILED DESCRIPTION

Below, example embodiments will be described in detail with reference to the accompanying drawings.

In the detailed description, components described with reference to the terms "unit", "module", "block", "~er or ~or", etc., and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
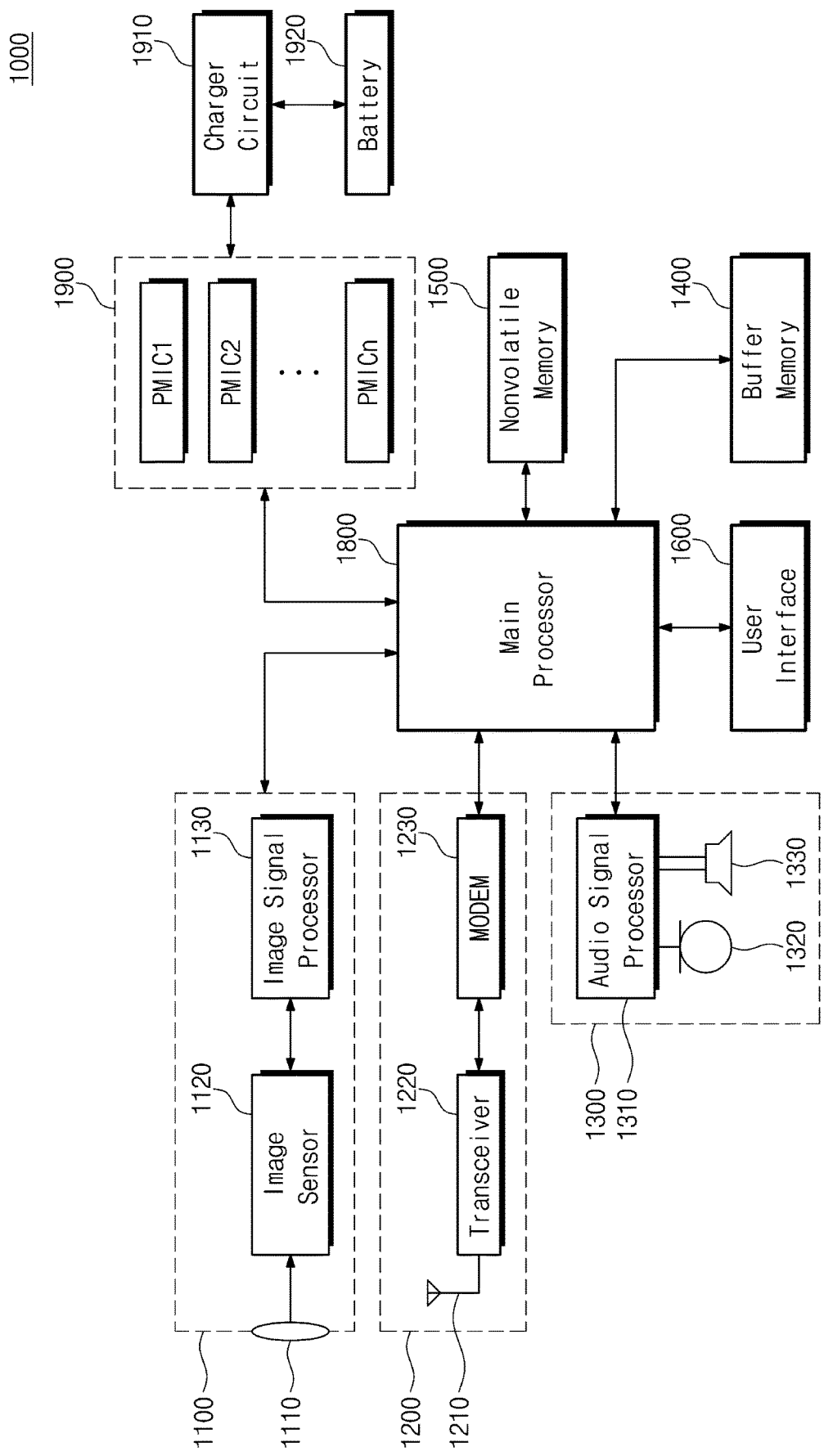
FIG. 1 is a block diagram illustrating a configuration of an electronic device according to an example embodiment.

FIG. 1 is a block diagram illustrating a configuration of an electronic device 1000 according to an example embodiment. For example, the electronic device 1000 may be implemented as various types of electronic devices such as a desktop computer, a tablet computer, a laptop computer, a smartphone, a wearable device, a workstation, a server, an electric vehicle, home appliances, and medical appliances.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, a power managing device 1900, and a charger circuit 1910.

For example, the electronic device 1000 may be connected with a battery 1920, and the battery 1920 may supply a power that is used for an operation of the electronic device 1000. However, the present disclosure is not limited to this example. For example, a power that is supplied to the electronic device 1000 may be provided from a power source different from the battery 1920.

The image processing block 1100 may receive a light through a lens 1110. An image sensor 1120 and an image signal processor 1130 included in the image processing block 1100 may generate image information associated with an external object, based on the received light.

The communication block 1200 may exchange signals with an external device/system through an antenna 1210. A transceiver 1220 and a MODEM (Modulator/Demodulator) 1230 of the communication block 1200 may process signals, which are exchanged with the external device/system, depending on one or more of various wired/wireless communication protocols.

The audio processing block 1300 may process sound information by using an audio signal processor 1310. The audio processing block 1300 may receive an audio input through a microphone 1320 or may output an audio through a speaker 1330.

The buffer memory 1400 may store data that are used for an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of whether power is supplied. For example, the nonvolatile memory 1500 may include at least one of various nonvolatile memories such as a flash memory, a PRAM, an MRAM, a ReRAM, and a FRAM. For example, the nonvolatile memory 1500 may include a removable memory such as a secure digital (SD) card or a solid state drive (SSD), and/or an embedded memory such as an embedded multimedia card (eMMC).

The user interface 1600 may enable communication between the user and the electronic device 1000. For example, the user interface 1600 may include an input interface for receiving an input from the user and an output interface for providing information to the user.

The main processor 1800 may control overall operation of the components of the electronic device 1000. The main processor 1800 may perform various operations for the purpose of operating the electronic device 1000. For example, the main processor 1800 may be implemented with an operation processing device/circuit, which includes one or more processor cores, such as a general-purpose processor, a special-purpose processor, an application processor, or a microprocessor.

The power managing device 1900 and the charger circuit 1910 may supply a power which is used for operating the electronic device 1000. For example, the power managing device 1900 may be implemented with a plurality of power management integrated circuits (PMICs). This will be described with reference to FIG. 2.

Figure 2:
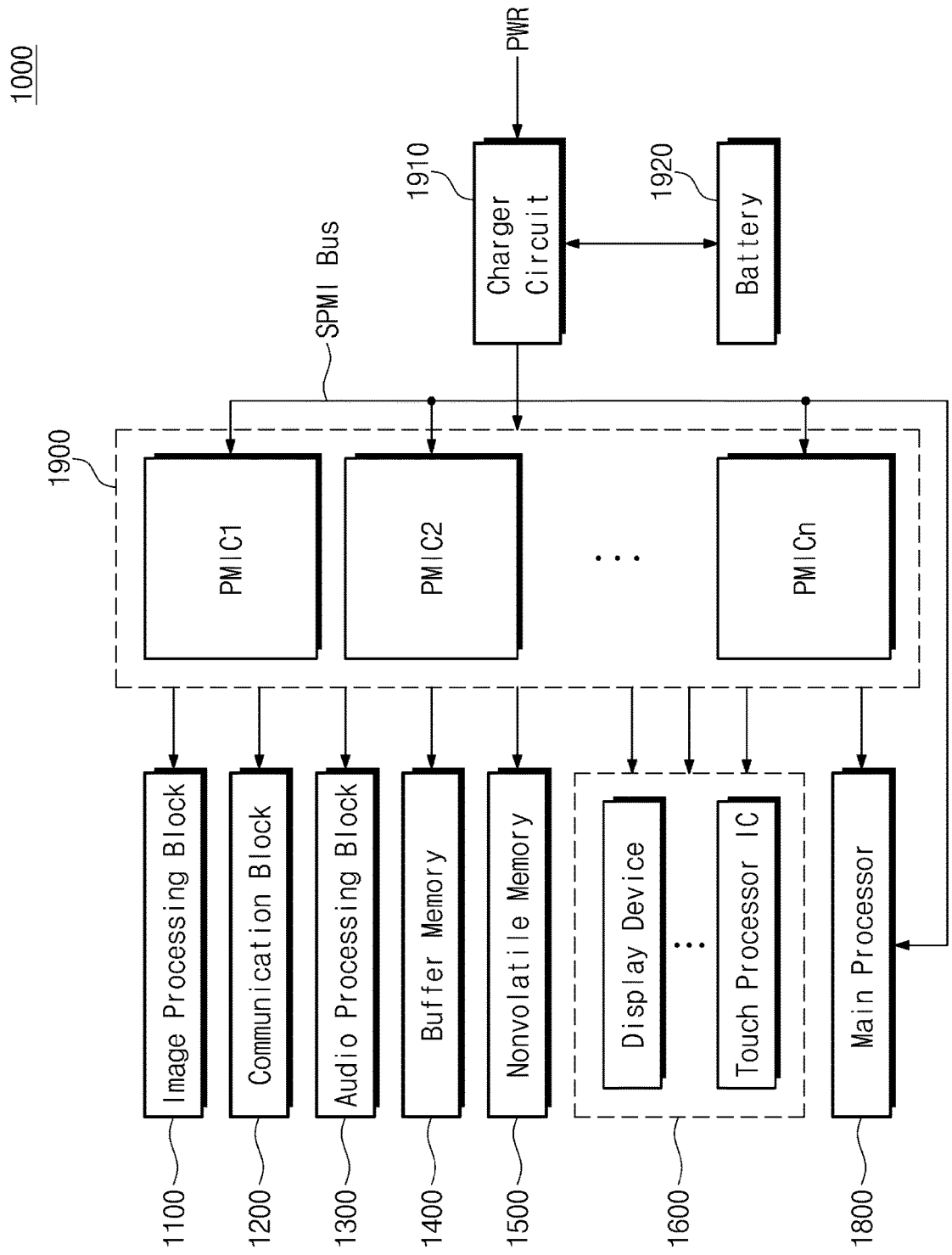
FIG. 2 is a block diagram illustrating a configuration associated with transmitting power to components in an electronic device according to an example embodiment.

FIG. 2 illustrates a configuration associated with transmitting a power to components in an electronic device according to an example embodiment.

The power managing device 1900 may supply a power to components 1100 to 1800 of the electronic device 1000 through power rails. For example, the charger circuit 1910 may output an input voltage based on a power PWR received from the battery 1920 and/or any other external power source. The power managing device 1900 may output a power to be supplied to the components 1100 to 1800 of the electronic device 1000, based on the input voltage. The power managing device 1900 may supply a power, which is obtained by appropriately converting the input voltage, to the components 1100 to 1800 of the electronic device 1000. For example, the charger circuit 1910 may be implemented outside the power managing device 1900 or may be implemented as at least a part of the PMICs constituting the power managing device 1900.

In an example embodiment, the power managing device 1900 may include a plurality of PMICs, each of which may supply a power to at least one component of the electronic device 1000. For example, the voltage output from each PMIC may be transmitted to at least one of the image processing block 1100, the communication block 1200, the audio processing block 1300, the buffer memory 1400, the nonvolatile memory 1500, the user interface 1600 (e.g., input/output interfaces such as a display device and a touch processing integrated circuit (IC)), and the main processor 1800. Each component of the electronic device 1000 may operate based on the transmitted voltage.

Voltages generated from the plurality of PMICs may be transmitted to the components 1100 to 1800 of the electronic device 1000 in a predetermined order or may be blocked in a predetermined order. To this end, the plurality of PMICs may be mutually synchronized during a power on sequence and a power off sequence. For example, the plurality of PMICs may perform communication, which is based on a system power management interface (SPMI) protocol, for synchronization.

The components illustrated in FIGS. 1 and 2 are provided for better understanding, and are not intended to limit the present disclosure. The electronic device 1000 may not include one or more of the components illustrated in FIGS. 1 and 2. Additionally or alternatively, the electronic device 1000 may further include at least one component not illustrated in FIGS. 1 and 2.

Figure 3:
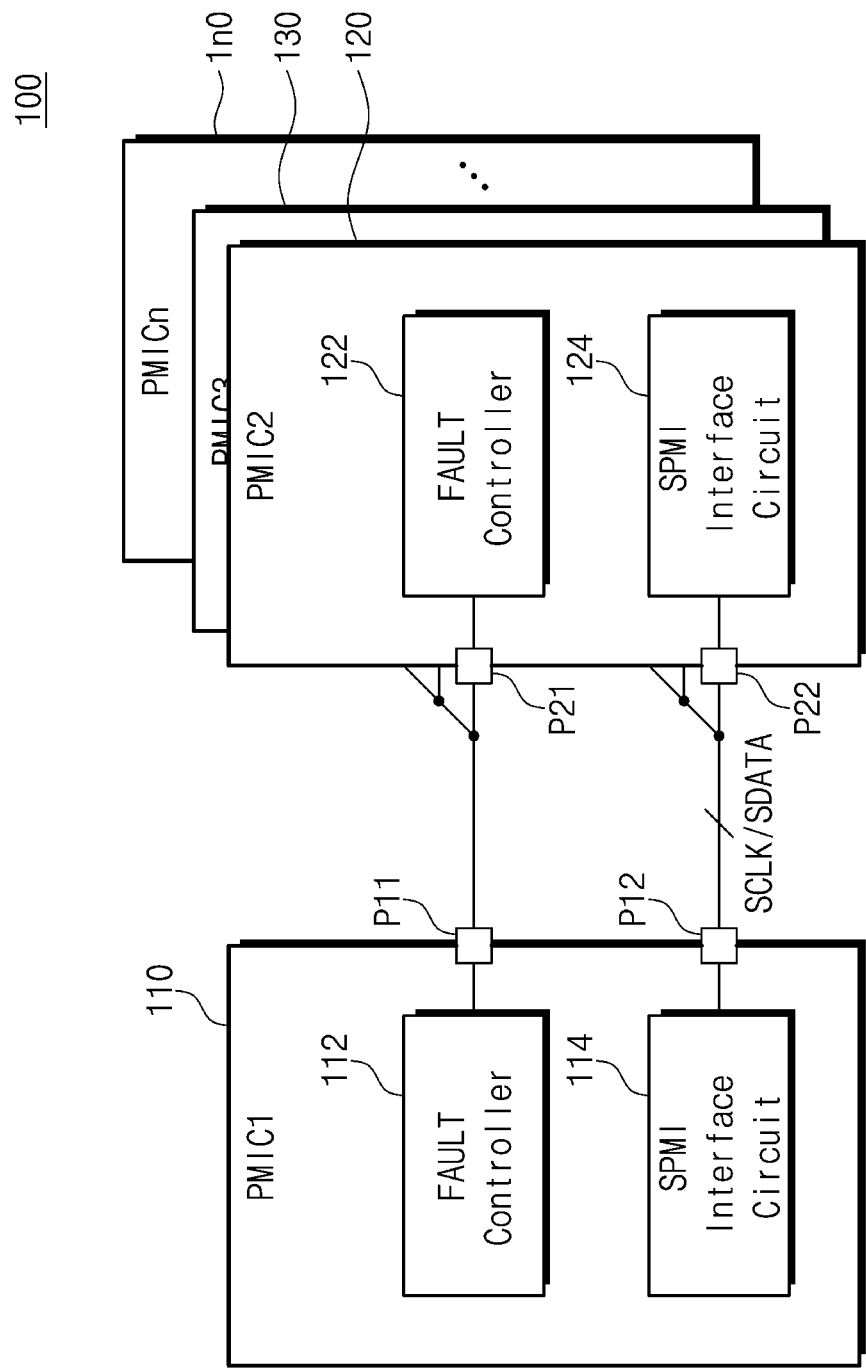
FIG. 3 illustrates a configuration of a power managing device according to an example embodiment.

FIG. 3 illustrates a configuration of a power managing device according to an example embodiment.

The power managing device 1900 may include a plurality of PMICs 110 to 1n0 (n being a natural number). The PMIC 110 may include a fault controller 112 and an SPMI interface circuit 114, and the other PMICs 120 to 1n0 may be configured to be similar to the PMIC 110. Fault controllers (e.g., 112, 122, etc.) of the plurality of PMICs may be connected with each other through a dedicated line, and SPMI interface circuits (e.g., 114, 124, etc.) of the plurality of PMICs may be connected with each other through a clock line and a data line. To this end, each PMIC may include a pin (e.g., P11, P21, etc.) connected with a fault controller and a pin (e.g., P12, P22, etc.) connected with an SPMI interface circuit.

In an example embodiment, the PMIC 110 may be a master (or main) PMIC. The PMIC 110 may control the overall operation of the power managing device 1900. For example, the PMIC 110 may operate as a bus of master (BOM) for communication with the other PMICs 120 to 1n0 during the power on sequence. The PMIC 110 may control power-on/off related operations of all the PMICs 110 to 1n0 constituting the power managing device 1900, based on information obtained from the other PMICs 120 to 1n0. In addition, the PMIC 110 may include a separate auxiliary power source and/or a back-up power source.

In an example embodiment, each of the PMICs 120 to 1n0 may be a slave (or sub) PMIC. Each of the PMICs 120 to 1n0 may inform the PMIC 110 of their own power on reset (POR) state through a fault pin (e.g., P21, etc.) in the power on sequence. Each of the PMICs 120 to 1n0 may inform the PMIC 110 of an off request due to an abnormal state through the fault pin (e.g., P21, etc.) in the power off sequence. Each of the PMICs 120 to 1n0 may be powered on (or powered off) based on data SDATA received from the PMIC 110 through the SPMI communication during the power on sequence (or power off sequence).

In an example embodiment, the pins P11, P21, etc., may be used to inform an abnormal state of each PMIC, and the pins P12, P22, etc., may be used to transmit or receive the data SDATA associated with power-on or power-off.

For example, when an abnormal state of the PMIC 110 is detected, the PMIC 110 may change a voltage level of the pin P11 to notify the other PMICs 120 to 1n0 that an abnormal state occurs in the master PMIC. Afterwards, the PMIC 110 may transmit the data SDATA associated with the power off sequence to the PMICs 120 to 1n0 through the SPMI communication.

For example, when an abnormal state of the PMIC 120 is detected, the PMIC 120 may change a voltage level of the pin P21 to notify the PMIC 110 that an abnormal state occurs in the slave PMIC 120. Afterwards, the PMIC 110 may recognize that an abnormal situation occurs in the PMIC 120, and may transmit the data SDATA associated with the power off sequence to the PMICs 120 to 1n0 through the SPMI communication.

The pins P12 and P22 may be a common pin. That is, in the remaining period other than the power on sequence and the power off sequence (e.g., in a period between the power-on and the power-off, in which an electronic device operates), the communication between the PMICs 110 to 1n0 through the pins P12, P22, etc., may be blocked, and the pins P12, P22, etc., may be used for the SPMI communication between each PMIC and the main processor 1800 (refer to FIG. 1).

Figure 4:
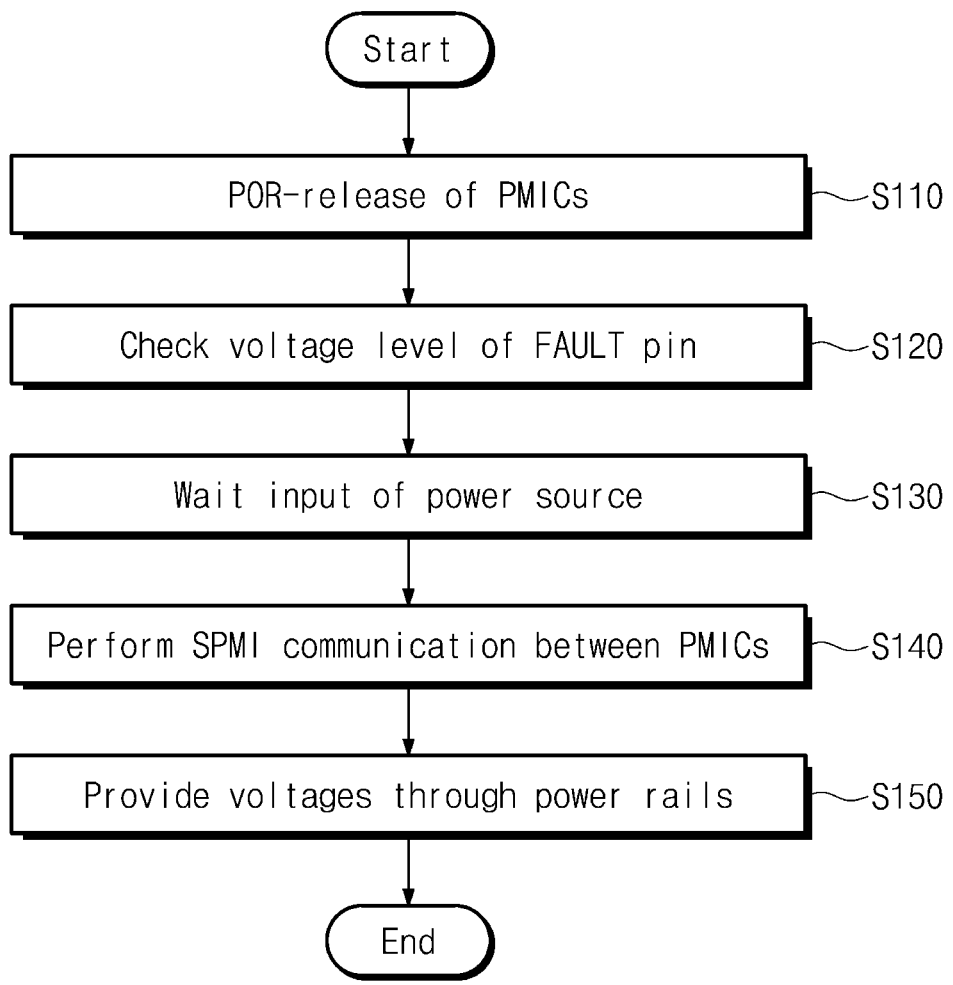
FIG. 4 is a flowchart illustrating an operating method of a power managing device according to an example embodiment.

FIG. 4 is a flowchart illustrating an operating method of a power managing device according to an example embodiment.

Referring to FIGS. 3 and 4 together, a power-on-reset (POR) of each of the PMICs 110 to 1n0 may be sequentially released (S110). As the power on resets of the PMICs 110 to 1n0 are released, some of values associated with an operation of each PMIC may transition from an initial value. The POR release operation associated with the PMICs 110 to 1n0 may be performed depending on a predetermined sequence.

When the power on resets of all PMICs are released, a voltage level of a node including the fault pins P11, P21, etc., may transition from the initial value to logic high. In this case, the PMIC 110 may monitor the voltage level of the fault pin (S120). Here, the voltage level of the fault pin may mean a voltage level of the node including the fault pins P11, P21, etc.

The PMIC 110 that determines that the voltage level of the fault pin transitions from logic low to logic high may wait an input of a power source (S130). When the power is input to the PMICs 110 to 1n0, the PMIC 110 may perform SPMI communication with each of the other PMICs 120 to 1n0 such that power rails of the other PMICs 120 to 1n0 are powered on in a sequence synchronized through the SPMI communication (S140). As a result, voltages may be supplied to other external components (e.g., 1100 to 1800 of FIG. 2) through the power rails of the PMICs 110 to 1n0 (S150).

Figure 5:
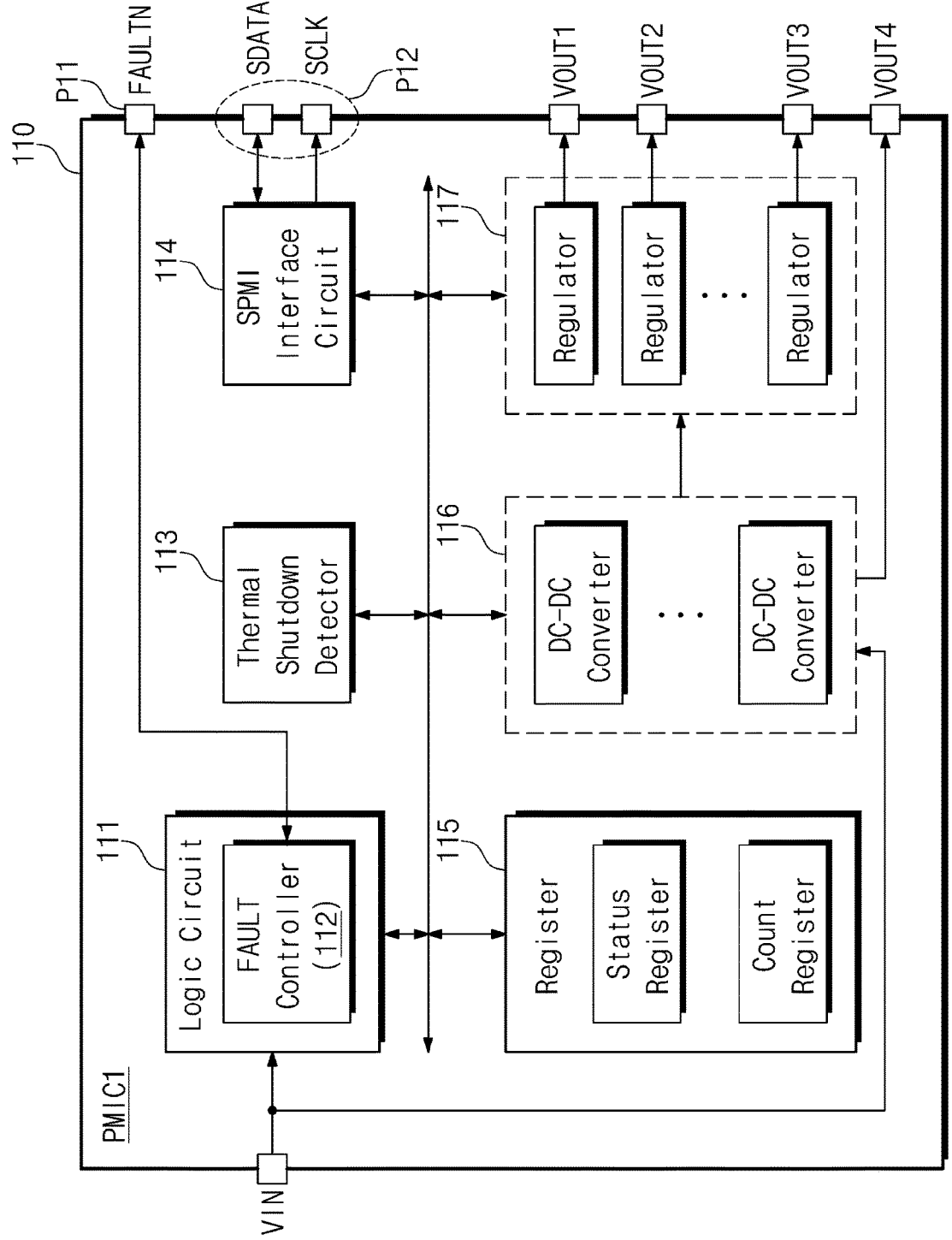
FIG. 5 illustrates a configuration of a PMIC according to an example embodiment.

FIG. 5 illustrates a configuration of a PMIC according to an example embodiment. The PMIC 110 of FIG. 3 is illustrated as an example. The PMIC 110 may include a logic circuit 111, a thermal shutdown detector 113, the SPMI interface circuit 114, a register 115, a DC-DC conversion circuit 116, and a regulating circuit 117. The DC-DC conversion circuit 116 may include a plurality of DC-DC converters, and the regulating circuit 117 may include a plurality of regulators. The plurality of DC-DC converters and the plurality of regulators may be referred to as a "power rail".

The logic circuit 111 may control the overall operation of the PMIC 110. For example, the logic circuit 111 may manage an order in which output voltages (e.g., VOUT1 to VOUT4 and output voltages of the other PMICs 120 to 1n0 of FIG. 3) of the PMICs are respectively supplied to relevant components of an electronic device. An output voltage may be an output of the charger circuit 1910 (refer to FIG. 2), which is based on the battery 1920 (refer to FIG. 2) or the external power PWR. The logic circuit 111 may include the fault controller 112. The fault controller 112 may determine whether an abnormal situation occurs in an external PMIC, by detecting a voltage level of the fault pin P11. The fault controller 112 may inform the external PMIC that an abnormal situation occurs in the PMIC 110, by controlling a voltage level of the fault pin P11.

The thermal shutdown detector 113 may detect internal heat of the PMIC 110. When the detected heat (or temperature) exceeds a specific level, the thermal shutdown detector 113 may generate a thermal shutdown-related signal. The thermal shutdown detector 113 may provide the thermal shutdown-related signal to the fault controller 112, and the fault controller 112 may control a voltage level of the fault pin P11 based on the thermal shutdown-related signal.

The SPMI interface circuit 114 may provide an interface based on the SPMI protocol. The SPMI interface circuit 114 may include various logic elements for generating a clock SCLK, and the data SDATA to be output in synchronization with the clock SCLK. According to the SPMI protocol, the clock SCLK and the data SDATA may be transmitted through separate (or independent) pins, respectively. However, for brevity of illustration, a pin for transmitting the clock SCLK and a pin for transmitting the data SDATA are collectively marked by "P12".

The register 115 may include a status register and a count register. The status register may store information about a status associated with booting of a PMIC in the power on sequence. The count register may store a counting value associated with power-on of powered-on DC-DC converters and regulators. The logic circuit 111 may determine whether the power on sequence is normally performed, with reference to a value stored in the status register and a value stored in the count register.

The DC-DC conversion circuit 116 may convert a voltage of the battery 1920 and/or an external power source to output voltages required by the PMIC 110. For example, based on an input voltage VIN, the DC-DC conversion circuit 116 may output a voltage(s) required by the regulating circuit 117, and may output the voltage VOUT4 to be used by an external component of the PMIC 110. For example, each of the DC-DC converters constituting the DC-DC conversion circuit 116 may be a step-up converter (e.g., a boost converter) or a step-down converter (e.g., a buck converter).

The regulating circuit 117 may convert a voltage output from at least one of the DC-DC converters constituting the DC-DC conversion circuit 116 and may output various levels of output voltages VOUT1 to VOUT3. For example, each of the regulators constituting the regulating circuit 117 may be a low drop-out (LDO) regulator.

The output voltages VOUT1 to VOUT3 of regulators and the output voltage VOUT4 of a DC-DC converter are illustrated in FIG. 5, but the number of output voltages is not limited thereto. The PMIC 110 may further include a band gap reference voltage generator for generating a band gap reference voltage, a ROM storing information necessary for an operation of the PMIC 110, a circuit performing over current protection or over voltage protection, etc.

In addition, the components illustrated in FIG. 5 may be classified or illustrated depending on functions thereof, and at least a part of a function to be performed by each component may be merged with a function of any other component. Configurations of the other PMICs 120 to 1n0 may be mostly the same as the configuration of the PMIC 110 of FIG. 5. However, the PMICs 120 to 1n0 may not perform the power on sequence and the power off sequence independently. That is, the PMICs 120 to 1n0 may perform the power on sequence and the power off sequence under control of the PMIC 110.

Figure 6:
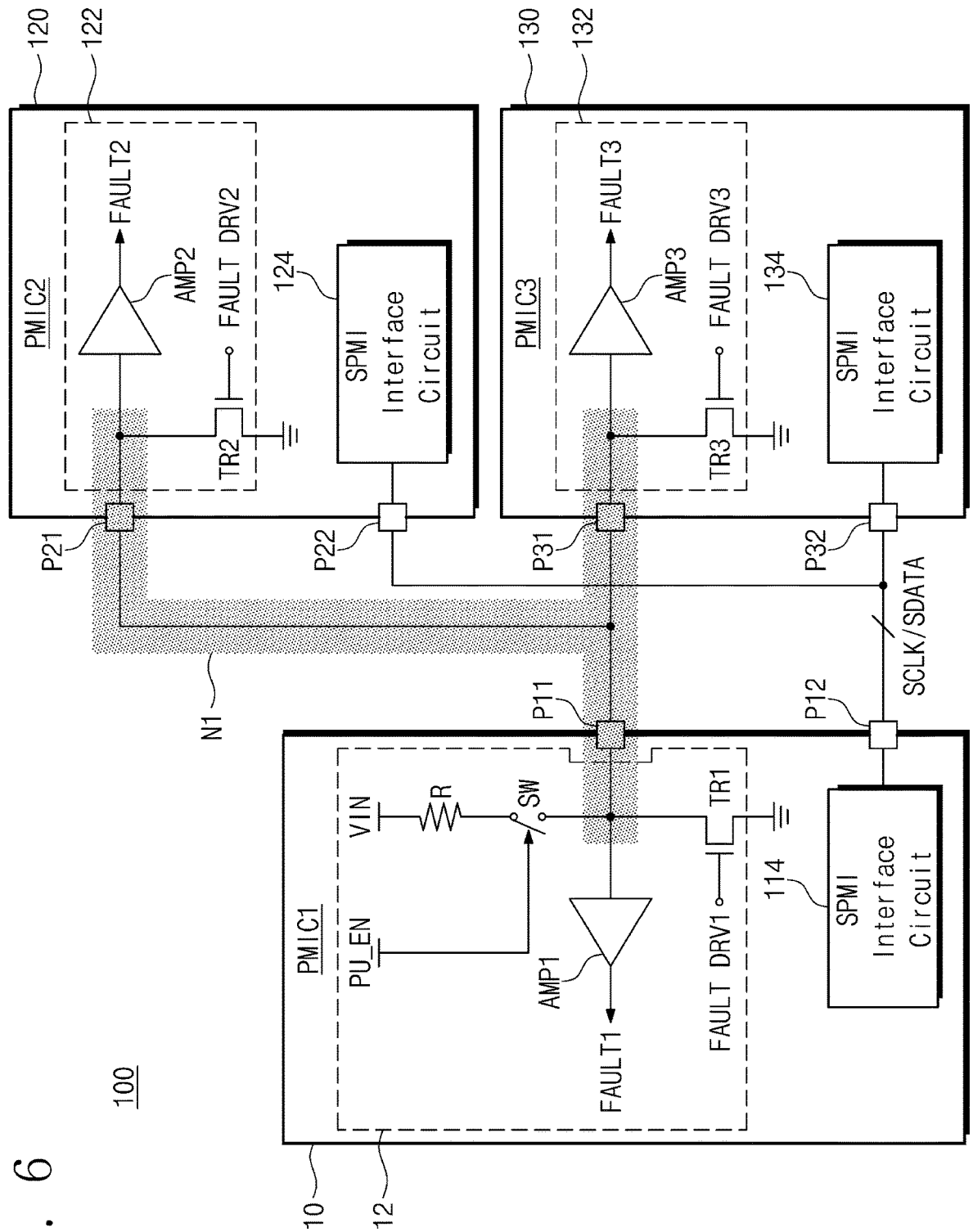
FIG. 6 illustrates a configuration of a fault controller of a PMIC according to an example embodiment.

FIG. 6 illustrates a configuration of a fault controller of a PMIC according to an example embodiment. For brevity of illustration, one master PMIC 110 and two slave PMICs 120 and 130, and configurations of fault controllers 112, 122, and 132 are illustrated in detail together with SPMI interface circuits 114, 124, and 134.

The PMIC 110 may perform the power on sequence after determining that an abnormal situation does not occur in any of the PMICs of the power managing device 100. Each of the fault controllers 112, 122, and 132 of the PMICs 110, 120, and 130 may notify any other PMIC that an abnormal situation does not occur, by maintaining a voltage of a node N1, with which fault pins P11, P21, and P31 are connected with, at a specific level. The PMIC 110 may recognize that an abnormal situation does not occur in the PMICs 120 and 130, by determining a level of the node N1.

The fault controller 112 may include a transistor TR1, an amplifier AMP1, a switch SW, and a pull-up resistor "R". The fault controller 112 may have an open-drain structure. That is, a source electrode of the transistor TR1 may be grounded, and a drain electrode thereof may be connected with the node N1 with which the fault pins P11, P21, and P31 are connected. When the switch SW is turned on by activation of a pull-up enable signal PU_EN, the input voltage VIN may be transferred to the node N1 through the pull-up resistor "R". The amplifier AMP1 may amplify a voltage of the node N1 to output a fault signal FAULT1.

The fault controller 122 may include a transistor TR2 and an amplifier AMP2, and the fault controller 132 may include a transistor TR3 and an amplifier AMP3. A source electrode of the transistor TR2 may be grounded, and a drain electrode thereof may be connected with the node N1. As in the above description, a source electrode of the transistor TR3 may be grounded, and a drain electrode thereof may be connected with the node N1. The amplifier AMP2 may amplify a voltage of the node N1 to output a fault signal FAULT2, and the amplifier AMP3 may amplify a voltage of the node N1 to output a fault signal FAULT3.

First, before a power on reset is released initially, each PMIC may allow a voltage level of the node N1 to maintain logic low. For example, the fault controller 112 may activate a fault driving signal FAULT DRV1 (e.g., to logic high), the fault controller 122 may keep pull-up enable signal PU_EN deactivated (e.g., logic low) and activate a fault driving signal FAULT DRV2 (e.g., to logic high), and the fault controller 132 may activate a fault driving signal FAULT DRV3 (e.g., to logic high). In this case, the switch SW will be off, and all the transistors TR1, TR2 and TR3 may be turned on. Thus, a voltage level of the node N1 may be maintained at logic low (i.e., a ground).

Afterwards, as the power on reset of the PMIC 110 is released and the power on resets of the other PMICs 120 and 130 are then sequentially released, the fault driving signals FAULT DRV1, FAULT DRV2, and FAULT DRV3 may be deactivated and the pull-up enable signal PU_EN may be activated (e.g., logic high). In this case, a voltage level of the node N1 may transition to logic high. The PMIC 110 may determine that the power on resets of all PMICs are released, by detecting that the voltage level of the node N1 transitions to logic high. The PMICs 110, 120, and 130 may wait for an input of a power source.

Figure 7:
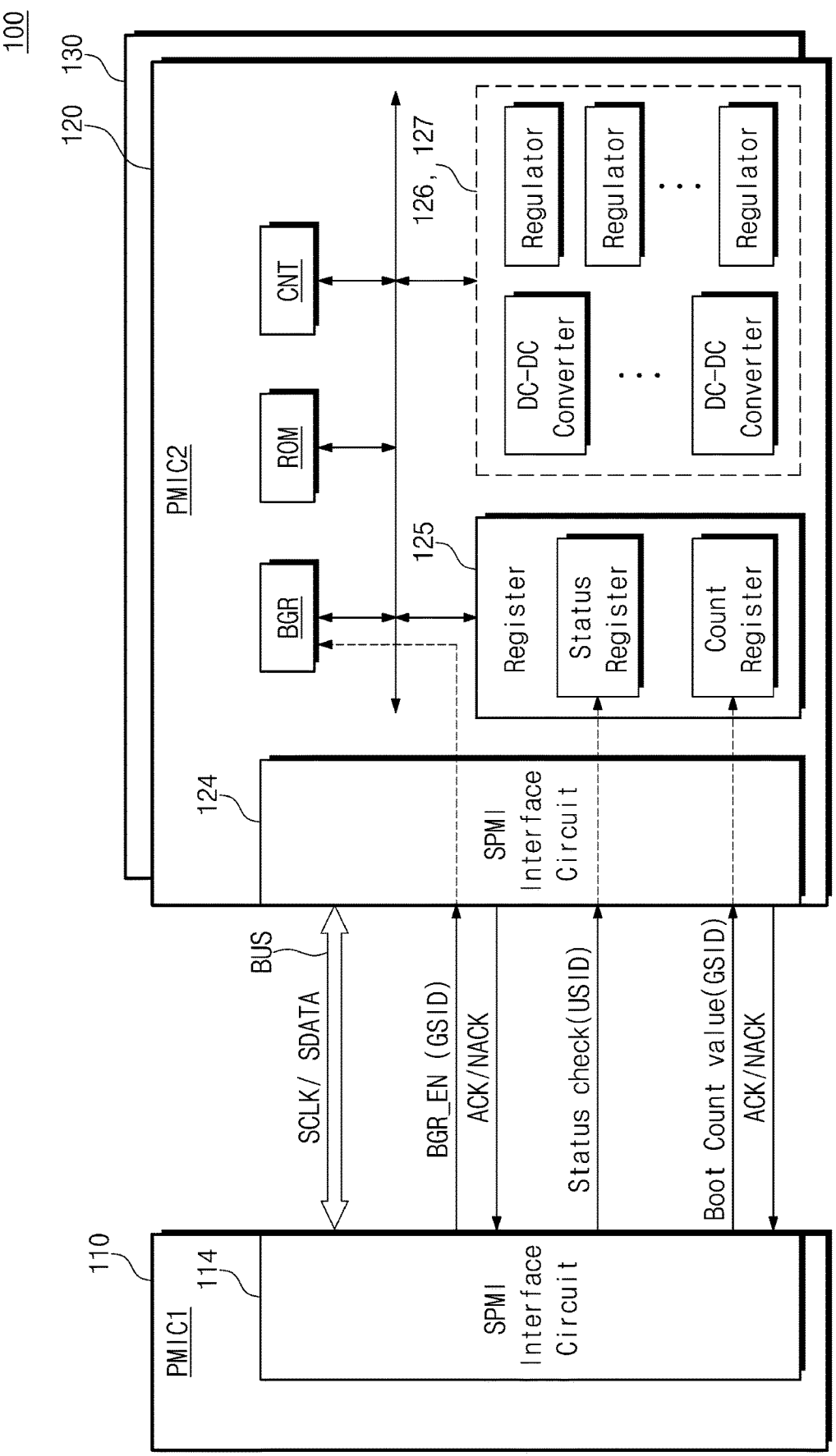
FIG. 7 illustrates operations in a power on sequence of PMICs according to an example embodiment.

FIG. 7 illustrates operations in a power on sequence of PMICs according to an example embodiment. FIGS. 8A and 8B illustrate tables associated with a boot count in a power on sequence according to an example embodiment.

Referring to FIG. 7, when an input of a power to each PMIC is detected, each PMIC may activate a power of a regulator necessary for data input/output through each SPMI interface circuit (e.g., 114, 124, etc.). Each PMIC releases a reset of each SPMI interface circuit (e.g., 114, 124, etc.) and determines whether a SPMI bus is in an idle state. When the SPMI bus is in the idle state, the SPMI communication is possible, and the PMIC 110 may communicate with the PMICs 120 and 130.

The PMIC 110 may transmit, to the PMICs 120 and 130, a band gap reference enable signal BGR_EN to control each of the PMICs 120 and 130 to generate a band gap reference voltage. For example, the band gap reference enable signal BGR_EN may be transmitted as a group ID GSID (i.e., in broadcasting scheme). The group ID GSID may include identifiers of one or more PMICs, and the PMIC 110 may transmit the band gap reference enable signal BGR_EN to at least one of the PMICs 120 and 130 by using the same group ID GSID. For convenience of description, it is assumed that the PMICs 120 and 130 have the same group ID GSID.

When the PMICs 120 and 130 receive the band gap reference enable signal BGR_EN, a band gap reference voltage generator BGR may generate a band gap reference voltage necessary for an operation of a PMIC. The PMICs 120 and 130 receiving the band gap reference enable signal BGR_EN may transmit, to the PMIC 110, a signal ACK indicating that a band gap reference voltage is normally generated or a signal NACK indicating that the band gap reference voltage is not normally generated.

The PMIC 110 may check statuses of the PMICs 120 and 130. A status check may be performed by using a unique ID USID. That is, each PMIC may have a unique ID, and the PMIC 110 may transmit different unique IDs to the PMICs 120 and 130.

The PMIC 110 may check a status of the PMIC 120 by reading a status register value of a register 125. For example, a value indicating whether the band gap reference voltage generator BGR of the PMIC 120 is normally activated, a value indicating whether various setting values stored in the ROM are normally loaded onto the register 125, a value indicating whether a state machine operates normally, etc., may be stored in the register 125.

The PMIC 110 may check whether DC-DC converters and regulators of the PMICs 120 and 130 are normally powered on. To this end, the PMIC 110 may sequentially transmit boot count values to the PMICs 120 and 130 by using the group ID GSID (i.e., in a broadcasting scheme). For example, the PMIC 110 may sequentially transmit boot values from "1" to a given number. An example of tables indicating boot count values that the PMIC 110 transmits, and a relationship between values counted depending on the boot count values are illustrated in FIGS. 8A and 8B.

First, referring to FIGS. 7 and 8A, the PMIC 110 may sequentially transmit boot counting values (i.e., "1" to "m+n") to the PMIC 120 every predetermined period (or periodically). For example, a device (i.e., a DC-DC converter or a regulator) corresponding to each boot count value may be determined in advance. The PMIC 120 that receives a boot count value from the PMIC 110 may power on a DC-DC converter or a regulator corresponding to the received boot count value.

A counter CNT of the PMIC 120 may increase a counting value as much as "1" when the corresponding DC-DC converter or regulator is normally powered on. Accordingly, when all the DC-DC converters and all the regulators are normally powered on, the last boot count value (i.e., m+n) received from the PMIC 110 may be equal to the last counting value of "m+n" of the counter CNT. The counting value of the counter CNT may be stored in a count register of the register 125. The PMIC 110 may check that the DC-DC converters and regulators of the PMIC 120 are normally powered on, by individually checking a value of the register 125 by using the unique ID USID, for each PMIC.

Next, referring to FIGS. 7 and 8B, the PMIC 110 may sequentially transmit the boot counting values (i.e., "1" to "m+n") to the PMIC 130 every predetermined period (or periodically). Operations of the PMIC 130 that are performed depending on the boot count values received from the PMIC 110 may be mostly similar to the operations of the PMIC 120 described above.

However, when the boot count value of "m+1" is received from the PMIC 110, a first regulator of the PMIC 130 corresponding to the received boot count value of "m+1" may not be normally powered on. Accordingly, the counter CNT of the PMIC 130 may not increase a counting value (i.e., m). This may mean that the counter CNT of the PMIC 130 maintains a previous value (i.e., a counting value of an m-th DC-DC converter).

As a result, a final counting value of the counter CNT of the PMIC 130 may be "m+(n−1)" and may not coincide with the boot count value of "m+n" received from the PMIC 110. The PMIC 110 may check that at least one of the DC-DC converters and regulators of the PMIC 130 is not normally powered on, by checking the final counting value (i.e., m+(n−1)) stored in a register (i.e., a component corresponding to the register 125) of the PMIC 130.

Afterwards, the PMIC 110 may again check whether the DC-DC converters and regulators of the PMIC 130 are normally powered on, by again sending the boot count values of the PMIC 130.

Figure 9:
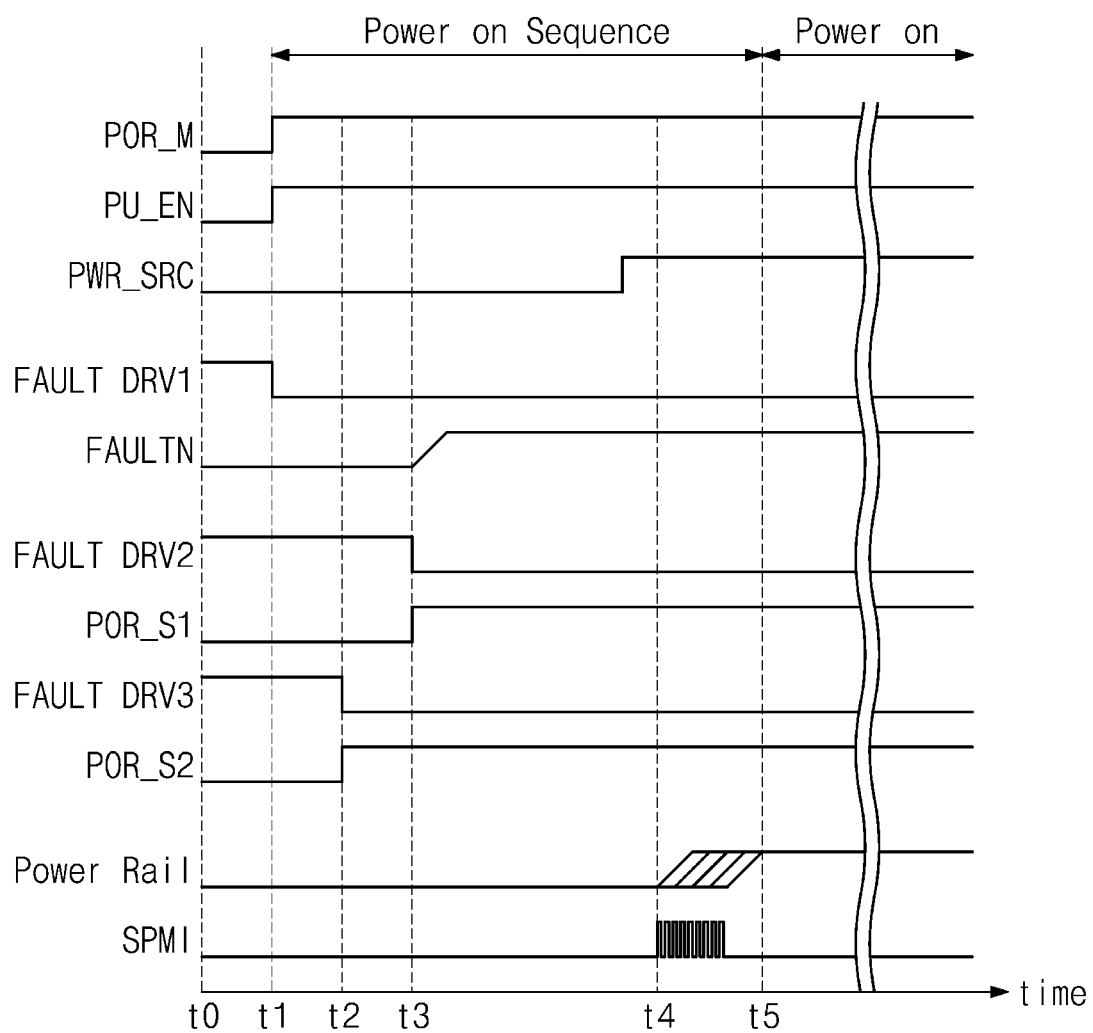
FIG. 9 is a timing diagram of signals associated with an operation of a power managing device according to an example embodiment.

FIG. 9 is a timing diagram of signals associated with an operation of a power managing device of FIGS. 6 and 7. Below, operations of PMICs in the power on sequence will be described with reference to FIGS. 6, 7, and 9.

From t0 to t1, each PMIC may be in a state where a power on reset is not released. Accordingly, values associated with operations of the PMICs 110, 120, and 130 may maintain an initial value. For example, a power-on-reset value POR_M of the PMIC 110, a power-on-reset value POR_S1 of the PMIC 120, and a power-on-reset value POR_S2 of the PMIC 130 may be "0". Because a value of the pull-up enable signal PU_EN is "0", the input voltage VIN may not be transferred to the node N1 with which the pins P11, P21, and P31 are connected. Because values of the fault driving signals FAULT DRV1, FAULT DRV2, and FAULT DRV3 are logic high (i.e., "1"), all the transistors TR1, TR2, and TR3 may be turned on, and thus, a voltage value FAULTN of the node N1 may be "0".

At t1, a power on reset of the PMIC 110 may be released. Accordingly, the power-on-reset value POR_M of the PMIC 110 may transition from "0" to "1". As the pull-up enable signal PU_EN is activated to "1" and the fault driving signal FAULT DRV1 is deactivated to "0", the transistor TR1 may be turned off. Even though the transistor TR1 is turned off, because the other transistors TR2 and TR3 are still turned on, the value FAULTN of the node N1 may still be "0".

At t2, a power on reset of the PMIC 130 may be released. Accordingly, the power-on-reset value POR_S2 of the PMIC 130 may transition from "0" to "1". As the fault driving signal FAULT DRV3 is deactivated to "0", and thus, the transistor TR3 may be turned off. Because the transistor TR2 is still turned on, the value FAULTN of the node N1 may still be "0".

At t3, a power on reset of the PMIC 120 may be released. Accordingly, the power-on-reset value POR_S1 of the PMIC 120 may transition from "0" to "1". As the fault driving signal FAULT DRV2 is deactivated to "0", and thus, the transistor TR2 may be turned off. Because all the transistors TR1, TR2, and TR3 are turned off at t3, the voltage value FAULTN of the node N1 may transition from "0" to "logic high". However, for convenience of description, the voltage value FAULTN of logic high may be referred to as "1". That the voltage value FAULTN of the node N1 slowly transitions from "0" to "1" at t3 may conceptually show that the pins P11, P21, and P31 constituting the node N1 are affected by a capacitance component.

The PMIC 110 may determine that the power on resets of all the PMICs 110, 120, and 130 are released, by detecting that the voltage value FAULTN of the node N1 transitions from "0" to "1", and may wait an input of a power PWR_SRC. An example embodiment in which the power PWR_SRC is input at an arbitrary point in time between t3 and t4 is illustrated.

At t4, the PMIC 110 may perform the SPMI communication with the PMICs 120 and 130. The SPMI communication may be performed as described with reference to FIGS. 7, 8A, and 8B. When all statuses of the PMICs 120 and 130 are normal and the voltage value FAULTN of the node N1 is "1," voltages generated from the DC-DC converters and regulators of the PMICs 110, 120, and 130 may be transmitted to external components (e.g., 1100 to 1800 of FIG. 2) through power rails.

Afterwards, as the transmission of a voltage through the last power rail starts immediately before point in time t5, the communication between the PMICs 110, 120, and 130 through the SPMI interface circuits 114, 124, and 134 may be terminated. After t5, the SPMI interface circuits 114, 124, and 134 may be used for communication between the PMICs 110, 120, and 130 and the main processor 1800 (refer to FIG. 2).

Figure 10:
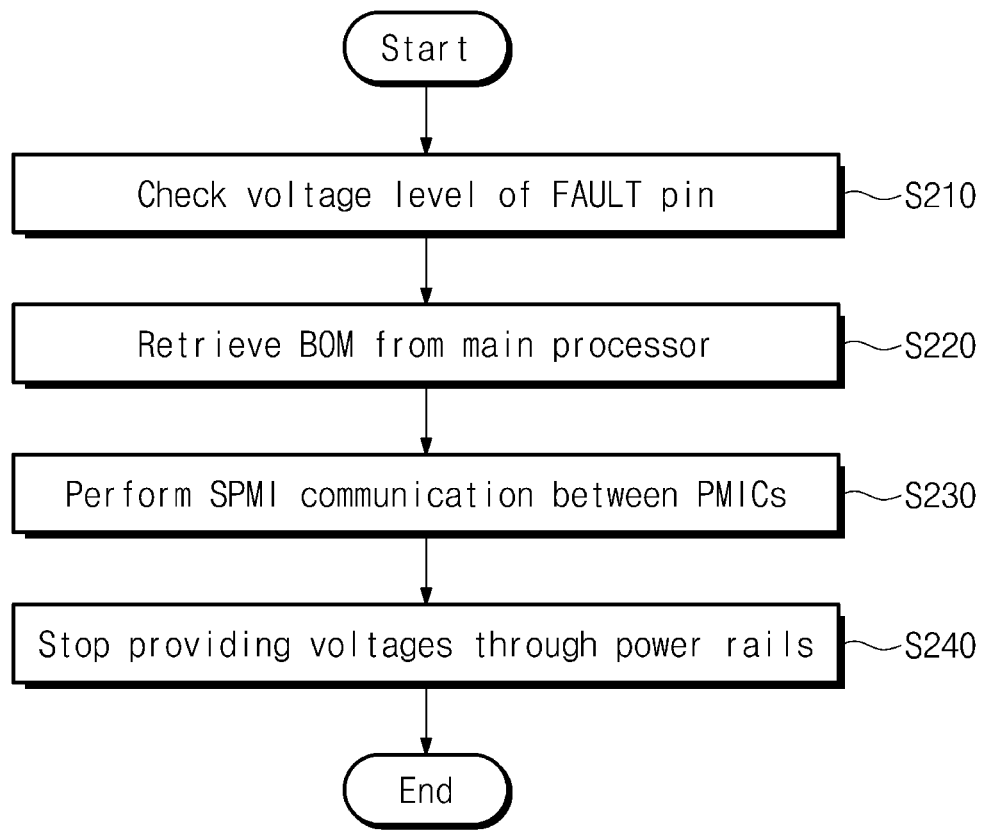
FIG. 10 is a flowchart illustrating an operating method of a power managing device according to an example embodiment.

FIG. 10 is a flowchart illustrating an operating method of a power managing device according to an example embodiment.

Referring to FIGS. 3 and 10 together, the PMIC 110 may recognize a power off source while the PMICs 110 to 1n0 supply voltages to the components of the electronic device 1000 (refer to FIG. 2) or while the PMICs 110 to 1n0 are communicating with the main processor 1800 (refer to FIG. 2) (S210). Here, the power off source may be caused by a power off flag provided by an upper control system (e.g., the main processor 1800), occurrence of an abnormal state in the PMIC 110, a power off request from the PMICs 120 and 130, etc.

When the PMIC 110 recognizes the power off source, the PMIC 110 may notify the PMICs 120 to 1n0 that the power off sequence is scheduled to be performed, by changing a voltage level of a node N1 including the fault pins P11, P21, etc. The PMIC 110 may notify the main processor 1800 (refer to FIG. 2) that the power off sequence is scheduled to be performed, and the SPMI communication between the main processor 1800 and the PMIC 110 may be interrupted by resetting the SPMI interface circuit 114.

The PMICs 120 to 1n0 that detect the change in the voltage level of the node N1 including the fault pins P11, P21, etc., may also provide a separate notification to the main processor 1800, and the SPMI communication between the main processor 1800 and the PMICs 120 to 1n0 may be interrupted by resetting the SPMI interface circuits 124, etc.

As the SPMI interface circuits 114, 124, etc., are reset, the PMIC 110 may retrieve the bus of master BOM from the main processor 1800 (S220). The PMIC 110 may perform the SPMI communication with the PMICs 120 to 1n0 through the pins P12, P22, etc., (S230).

The PMIC 110 may check statuses of the PMICs 120 to 1n0 while performing the SPMI communication. When a check result indicates that it is ready to power off, the PMIC 110 may sequentially block a voltage supply through power rails of the PMICs 110 to 1n0 constituting the power managing device 100, by controlling the PMICs 120 to 1n0.

Figure 11:
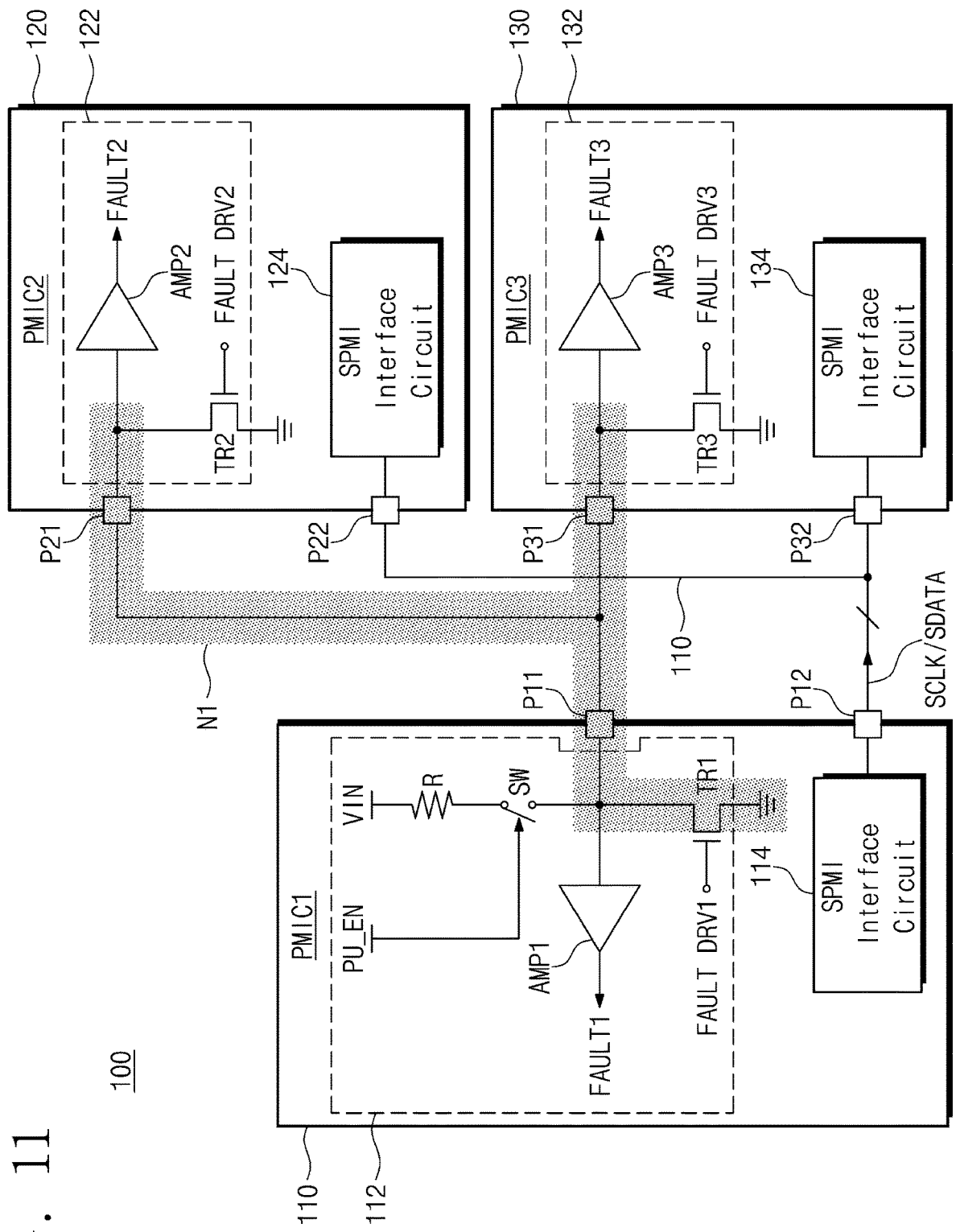
FIG. 11 illustrates an operation of a power managing device according to an example embodiment, in a power off sequence.

FIG. 11 illustrates a configuration of the power managing device 100 according to an example embodiment, in a power off sequence. In detail, this example embodiment is associated with occurrence of an abnormal state in the master PMIC 110. For brevity of illustration, the power managing device 100 is illustrated as including one master PMIC 110 and two slave PMICs 120 and 130.

In an example embodiment, when the power off source is recognized, the fault controller 112 of the PMIC 110 may drive the fault driving signal FAULT DRV1 with logic high for a predetermined time to notify the PMICs 120 and 130 of the power off source. For example, the power off source may be indicated by a power off flag indicated by an upper control system (e.g., the main processor 1800), occurrence of an abnormal state in the PMIC 110, etc. As such, the transistor TR1 may be turned on, and the node N1 including the fault pins P11, P21, and P31 may be grounded.

The PMICs 120 and 130 may amplify a voltage of the node N1 to respectively generate the fault signals FAULT2 and FAULT3, and a start of the power off sequence may be recognized based on a change in values of the fault signals FAULT2 and FAULT3.

The PMIC 110 may transmit the fault signal FAULT1 or a separate alarm signal based on the fault signal FAULT1, to the main processor 1800 (refer to FIG. 2). The PMICs 110, 120, and 130 may initialize the SPMI interface circuits 114, 124, and 134, respectively. As a result, the SPMI communication between the main processor 1800 and the PMICs 110, 120, and 130 may be interrupted. The PMIC 110 may retrieve the bus of master BOM from the main processor 1800, and the SPMI communication between the PMIC 110 and the PMICs 120 and 130 may be resumed.

Figure 12:
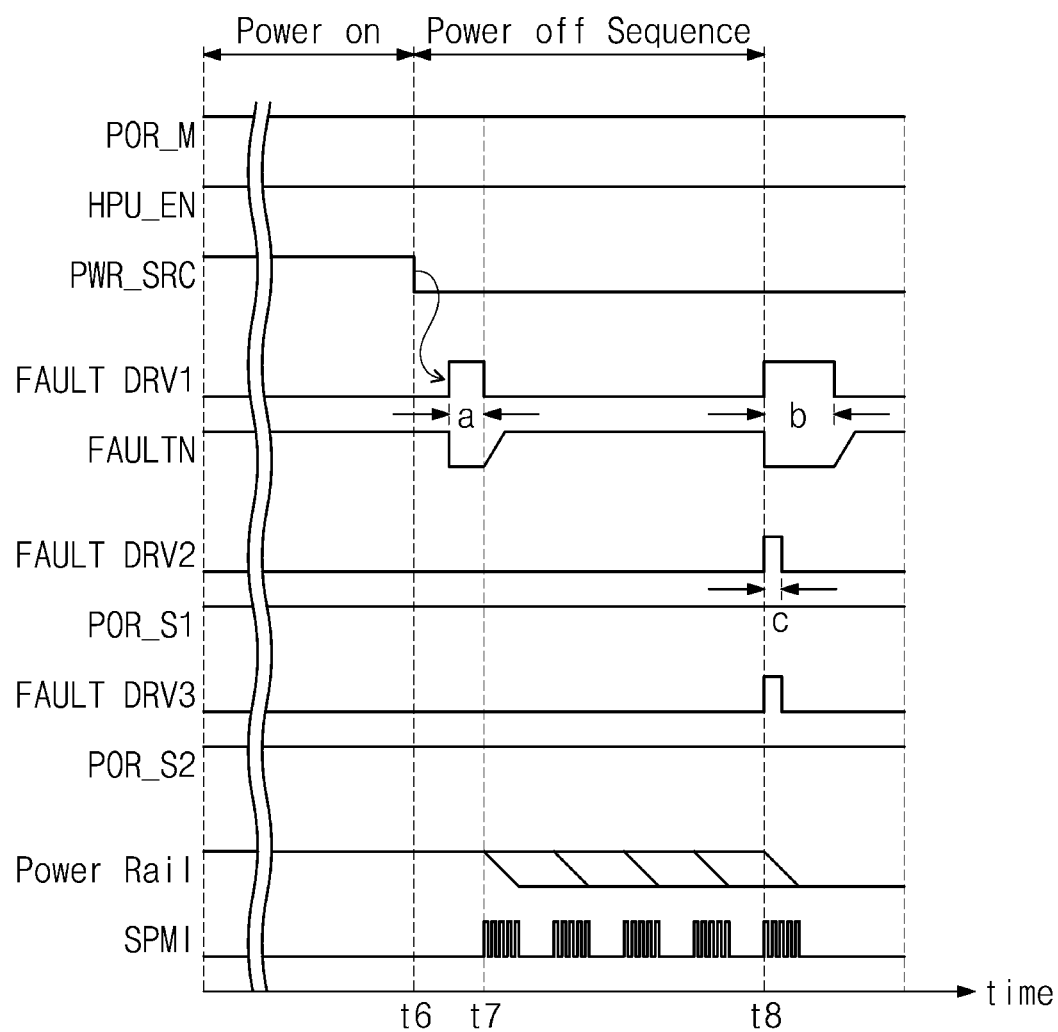
FIG. 12 is a timing diagram of signals associated with an operation of a power managing device according to an example embodiment.

FIG. 12 is a timing diagram of signals associated with an operation of a power managing device of FIG. 11. Below, operations of PMICs in the power off sequence will be described with reference to FIGS. 11 and 12.

A period up to t6 may be a period from after the power on sequence is performed to before the power off sequence is performed, and the electronic device 1000 (refer to FIG. 2) may operate based on voltages received from the power managing device 100. In a period from when the power on sequence is completed to t6, the main processor 1800 (refer to FIG. 2) may perform SPMI communication with the PMICs 110, 120, and 130 through the pins P12, P22 and P32.

When the power off source PWR_SRC is detected at t6, the fault controller 112 may drive the fault driving signal FAULT DRV1 with "1" during a first time (marked by "a"). As a result, the voltage value FAULTN of the node N1 including the pins P11, P21, and P31 may transition from "1" to "0".

In at least a portion of a period from t6 to t7, the PMICs 120 and 130 may determine that the power off sequence is performed by the PMIC 110, by detecting that the value FAULTN of the node N1 transitions from "0" to "1". The PMICs 110, 120, and 130 may respectively transmit the fault signals FAULT1, FAULT2, and FAULT2 or separate alarm signals, which are based on the fault signals FAULT1, FAULT2, and FAULT2, to the main processor 1800 (refer to FIG. 2). As a result, the SPMI communication between the PMICs 110, 120, and 130 and the main processor 1800 through the pins P12, P22 and P32 is interrupted.

While the SPMI communication is performed, the PMIC 110 may communicate with and check statuses of the PMICs 120 and 130 through the pins P12, P22 and P32. A status check may be performed through a unique ID USID individually for each PMIC. For example, as in the operation in the power on sequence illustrated in FIG. 7, the status check may be performed by accessing, at the PMIC 110, the register 125 of the PMIC 120 and a register (i.e., a component corresponding to the register 125) of the PMIC 130.

While the SPMI communication is performed, the PMIC 110 may check whether DC-DC converters and regulators of the PMICs 120 and 130 are normally powered off. To this end, the PMIC 110 may sequentially transmit the boot count values to the PMICs 120 and 130 by using the group ID GSID, and may check whether the DC-DC converters and regulators of the PMICs 120 and 130 are normally powered off, by comparing the previously transmitted boot count value and a counting value of a counter.

An operation in which the PMIC 110 transmits the boot count values to the PMICs 120 and 130 in the power off sequence is mostly similar to the operation in which the PMIC 110 transmits the boot count values to the PMICs 120 and 130 in the power on sequence, which is described with reference to FIGS. 8A and 8B. Thus, additional description will be omitted to avoid redundancy.

At t7 and t8, the SPMI communication between the PMIC 110 and the PMICs 120 and 130 starts. The PMIC 110 may check statuses of the PMICs 120 and 130, and may control the PMICs 120 and 130 such that voltages supplied through power rails of the PMICs 120 and 130 are blocked in a predetermined order.

At t8, the fault controller 112 of the PMIC 110 may activate the fault driving signal FAULT DRV1 while performing SPMI communication between the PMIC 110 and the PMICs 120 and 130, which is associated with power-off of the last power rail. For example, the fault driving signal FAULT DRV1 may be activated during a second time (marked by "b"), and thus, the voltage value FAULTN of the node N1 may transition from "1" to "0".

Even though a voltage supply through the power rails of the PMICs 120 and 130 is blocked through the SPMI communication in a period from t7 to t8, immediately after point in time t8, maintaining the fault driving signal FAULT DRV1 at logic high during the second time may indicate an additional off request for coping with the case where power-off is not normally performed in the PMICs 120 and 130. Even though the power off sequence through the SPMI communication in the period from t7 to t8 is performed, when at least one of voltages output from the power rails of the PMICs 120 and 130 is not blocked, the PMIC 120 or 130 may perform additional power-off until the value FAULTN of the node N1 transitions from "1" to "0".

In addition, after t8, the fault controller 122 of the PMIC 120 may activate the fault driving signal FAULT DRV2, and/or the fault controller 132 of the PMIC 130 may activate the fault driving signal FAULT DRV3. For example, the fault driving signal FAULT DRV2 and/or FAULT DRV3 may be activated during a third time (marked by "c"), and thus, the voltage value FAULTN of the node N1 may transition from "1" to "0".

This may be for coping with the case where power-off is not normally performed in the PMIC 110 even though a voltage supply through power rails of the PMIC 110 is blocked in the power off sequence. When at least one of voltages output from the power rails of the PMIC 110 in the period from t7 to t8 is not blocked, the PMIC 110 may perform additional power-off until the value FAULTN of the node N1 transitions from "1" to "0".

For brief illustration, the second time "b" and the third time "c" are illustrated as overlapping each other, but the second time "b" and the third time "c" may not overlap each other to determine a period in which the value FAULTN transitions to "0".

Figure 13:
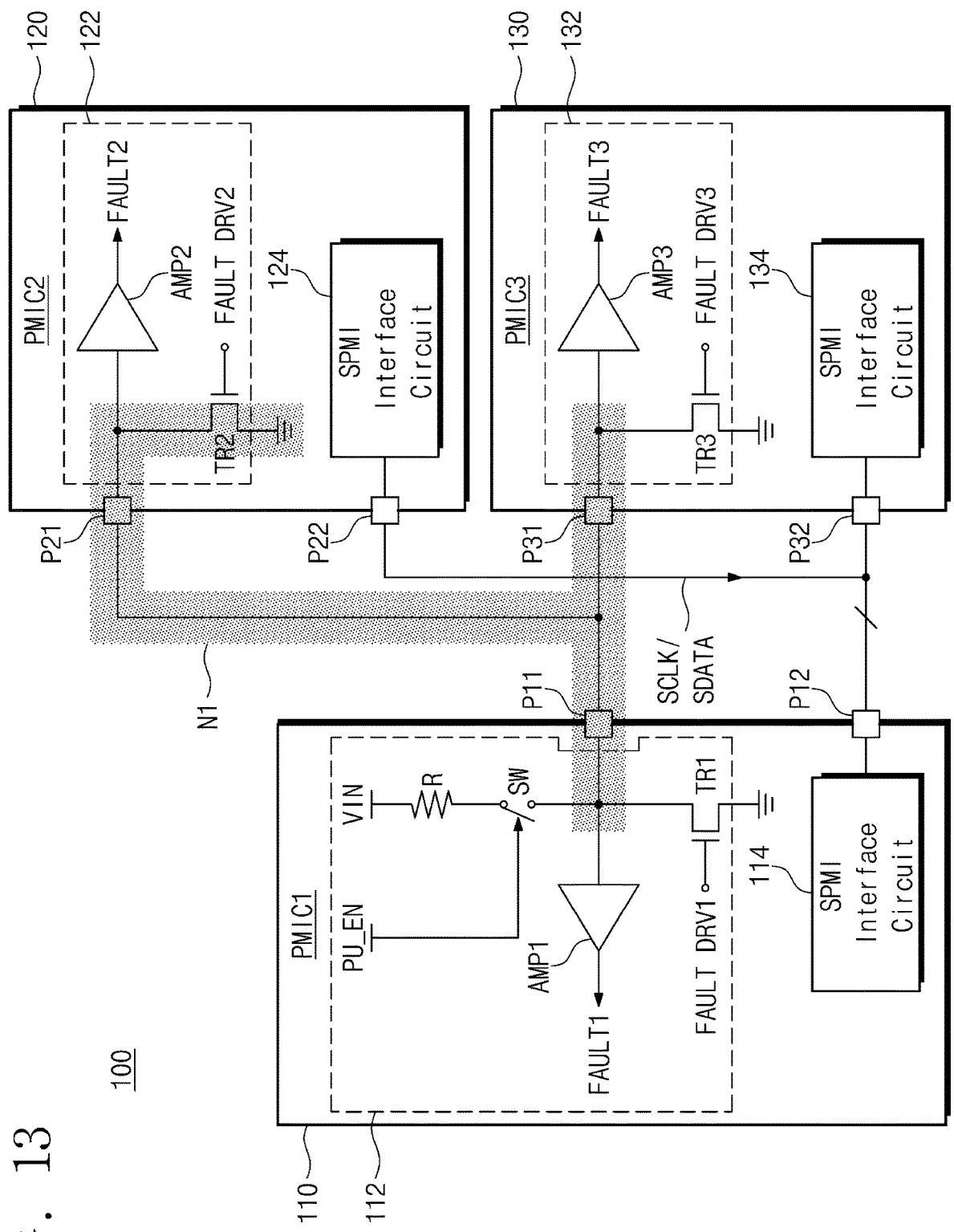
FIG. 13 illustrates an operation of a power managing device according to an example embodiment, in a power off sequence.

FIG. 13 illustrates an operation of the power managing device 100 according to an example embodiment, in a power off sequence. In detail, this example embodiment is associated with occurrence of an abnormal state in the slave PMIC 120.

In an example embodiment, when the power off source is recognized, the fault controller 122 of the PMIC 120 may drive the fault driving signal FAULT DRV2 with logic high for a predetermined time. For example, unlike the example embodiment of FIG. 11, the power off source may be a power off request from the PMIC 120 being a slave device. As a result, the node N1 may be grounded.

The PMIC 110 may recognize that an issue occurs in at least one of the PMICs 120 and 130, by determining the voltage value FAULT1 corresponding to a voltage level of the node N1. Afterwards, in response to a change in the voltage value FAULT1 of the node N1, the PMIC 110 may drive the fault driving signal FAULT DRV1 with logic high for a predetermined time.

The PMICs 120 and 130 may detect a voltage change of the node N1 caused by the fault driving signal FAULT DRV1 and may respectively generate the fault signals FAULT2 and FAULT3. The PMICs 120 and 130 may recognize that the power off sequence starts, based on a change in values of the fault signals FAULT2 and FAULT3.

Afterwards, at least one of the PMICs 110, 120, and 130 may transmit an alarm signal to the main processor 1800 (refer to FIG. 2), and the PMICs 110, 120, and 130 may initialize the SPMI interface circuits 114, 124, and 134, respectively. Accordingly, the SPMI communication between the main processor 1800 and the PMICs 110, 120, and 130 may be interrupted, and the SPMI communication between the PMIC 110 and the PMICs 120 and 130 through the pins P12, P22 and P32 may be resumed.

Figure 14:
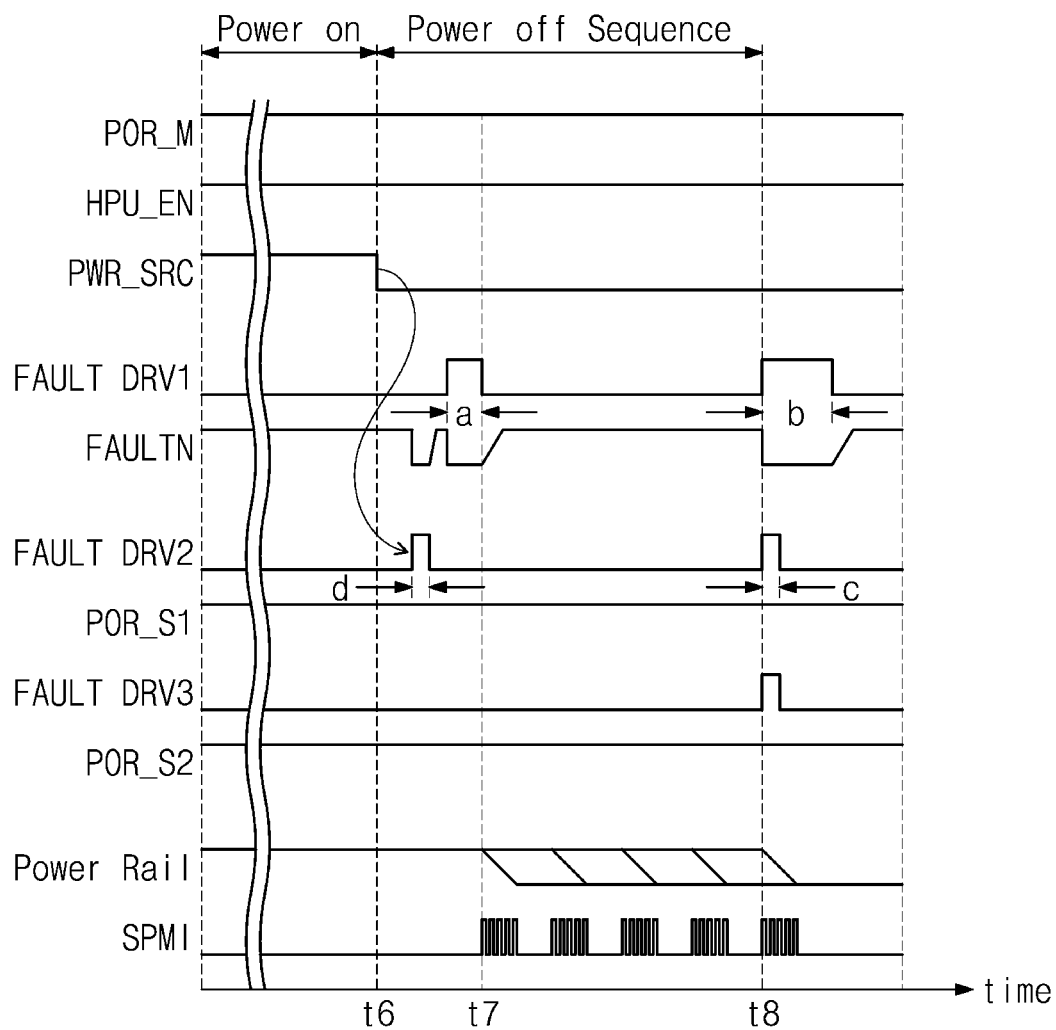
FIG. 14 is a timing diagram of signals associated with an operation of a power managing device according to an example embodiment.

FIG. 14 is a timing diagram of signals associated with an operation of a power managing device of FIG. 13. Because the timing diagram of FIG. 14 is mostly similar to the timing diagram of FIG. 12, a difference between the timing diagram of FIG. 14 and the timing diagram of FIG. 12 will be mainly described. Below, operations of PMICs in the power off sequence will be described with reference to FIGS. 13 and 14.

When the power off source PWR_SRC is detected at t6, the fault controller 122 may drive the fault driving signal FAULT DRV2 with logic high during a fourth time (marked by "d"). As a result, the voltage value FAULTN of the node N1 including the pins P11, P21, and P31 may transition to "1" to "0".

The PMIC 110 may recognize that an abnormal situation occurs in at least one of the PMICs 120 and 130, by detecting that the voltage value FAULTN of the node N1 including the pins P11, P21, and P31 transitions from "0" to "1" in at least a portion of a period from t6 to t7. To perform the power off sequence, the fault controller 112 may drive the fault driving signal FAULT DRV1 with "1" during the first time (marked by "a"). As a result, the voltage value FAULTN may transition to "1" to "0".

Afterwards, the SPMI communication between the main processor 1800 (refer to FIG. 2) and the PMICs 110, 120, and 130 through the pins P12, P22 and P32 may be interrupted, the SPMI communication between the PMIC 110 and the PMICs 120 and 130 through the pins P12, P22 and P32 may be resumed, and a voltage supply through power rails of the PMICs 110, 120, and 130 may be sequentially blocked depending on a predetermined order.

Figure 15:
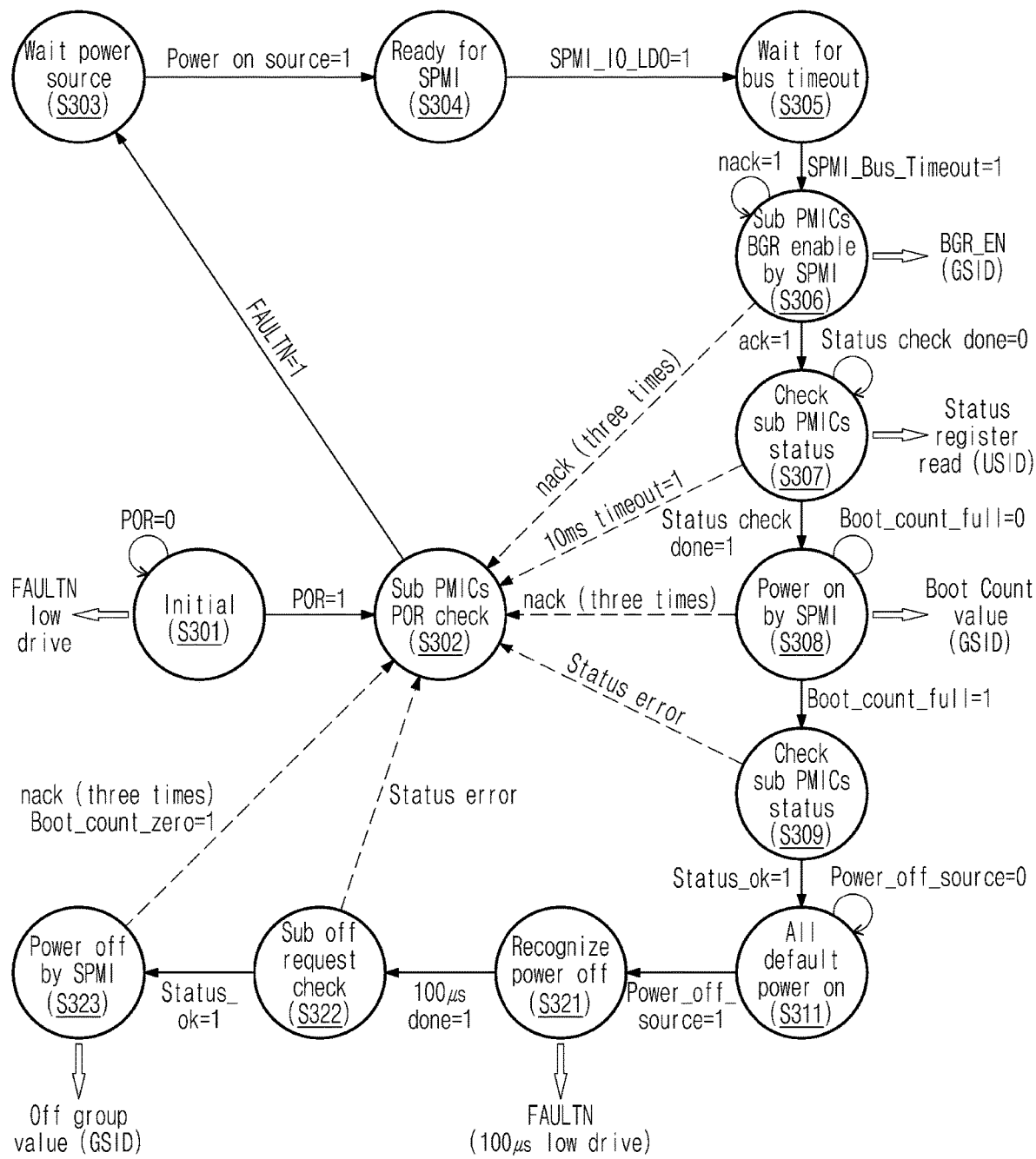
FIG. 15 illustrates a flowchart of a power sequence interface according to an example embodiment.

FIG. 15 illustrates an overall flowchart of a power sequence interface according to an example embodiment. Below, the description will be given with reference to FIGS. 6, 7, 9, 12, and 14 together.

In operation S301, before a power on reset is released, a power-on-reset (POR) value of each PMIC may maintain "0". Before an initial power on reset is released, each PMIC allows a fault pin to maintain logic low. For example, the fault controllers 112, 122, and 132 of the PMICs 110, 120, and 130 may drive the fault driving signals FAULT DRV1, FAULT DRV2, and FAULT DRV3 with logic high such that the transistors TR1, TR2, and TR3 are turned on, and the pull-up enable signal PU_EN with logic low such that switch SW is turned off. As such, voltage levels of the fault pins P11, P21, and P31 may be maintained at logic low.

The power on reset of the PMIC 110 may be released depending on a predetermined order (POR=1), and the PMIC 110 may check whether power on resets of the PMICs 120 and 130 are released (S302). For example, the PMIC 110 may determine that the power on reset of each of the PMICs 120 and 130 is released, by checking a voltage of a fault pin transitions from logic low to logic high (FAULTN=1). Afterwards, each PMIC may wait an input of a power on source (S303).

When the input of the power on source is determined (Power on source=1), the PMICs 110, 120, and 130 may become ready to perform SPMI communication (S304). For example, each of the PMICs 110, 120, and 130 may activate a power of a regulator necessary for an input/output of data through each of the SPMI interface circuits 114, 124, and 134 (SPMI_IO_LDO=1).

The PMIC 110 may wait for a predetermined time (e.g., 96 μs) (S305). When a predetermined time passes (SPMI_Bus_Timeout=1), the PMIC 110 may transmit, to the PMICs 120 and 130, the band gap reference enable signal BGR_EN together with the group ID GSID to control each of the PMICs 120 and 130 generates a band gap reference voltage. A PMIC whose group ID is identical to the received group ID GSID may generate a band gap reference voltage in response to the band gap reference enable signal BGR_EN.

When the communication between the PMIC 110 and the PMICs 120 and 130 is normally performed and the band gap reference voltages are generated, each of the PMICs 120 and 130 may transmit a signal ack (=1) to the PMIC 110. In contrast, when the communication between the PMIC 110 and the PMICs 120 and 130 is not normally performed (nack=1), the PMIC 110 may attempt to resume the communication with a relevant PMIC; when the communication fails continuously a threshold number of times (for example three times but not limited thereto) the power on reset may be performed on the relevant PMIC (S302).

While the band gap reference voltage is normally generated in each PMIC, the PMIC 110 may check statuses of the PMICs 120 and 130 (S307). For example, the register 125 (refer to FIG. 7) may store a value indicating whether a ROM code associated with an operation of each PMIC is normally loaded, a value indicating whether a state machine operates normally, etc. For example, the status check by the PMIC 110 may be performed by using the unique ID USID. The PMIC 110 may access the status register of each of the PMICs 120 and 130 to check a status every 200 μs (not limited thereto); when a timeout of 10 ms passes (not limited thereto), the power on reset may be performed on a relevant PMIC (S302).

When the status check of the PMICs 120 and 130 is completed (Status check done=1), the PMIC 110 may control the PMICs 120 and 130 such that the DC-DC converters and regulators of the PMICs 120 and 130 are powered on depending on a predetermined order (S308). The PMIC 110 may sequentially transmit boot count values to the PMICs 120 and 130 by using the group ID GSID. When the transmission of the boot count value by using the SPMI communication fails continuously three times (nack), the power on reset may be performed on a relevant PMIC (e.g., 130) (S302). The transmission of the boot count values may be continuously made until the last boot count value is transmitted to each PMIC from the PMIC 110 (Boot_count_full=1).

The PMIC 110 may check whether DC-DC converters and regulators of the PMICs 120 and 130 are normally powered on (S309). When at least one of the DC-DC converters and regulators of the PMICs 120 and 130 is not normally powered on, a boot count value received from the PMIC 110 and a counting value by the counter CNT (refer to FIG. 7) of a PMIC (e.g., 130) are different, and the PMIC (e.g., 130) transmits a status error to the PMIC 110. As a result, the power on reset may be performed on the PMIC (e.g., 130) (S302).

When DC-DC converters and regulators of each PMIC are normally powered on, a boot count value received from the PMIC 110 and a counting value by the counter CNT of each PMIC coincide with each other (Status_ok=1), and the PMIC 110 may check that power rails of all the PMICs are normally powered on. Afterwards, the electronic device may be in a power on state until the power off sequence is performed (S311), and a value of a power off source may be maintained at "0" until the power off source is detected (Power_off_source=0).

Afterwards, when the power off source is detected (Power_off_source=1), the PMIC 110 may detect power-off based on a change in the voltage value FAULTN of a fault pin (S321). For example, in the case of power-off due to an abnormal situation occurring in the PMIC 110 or power-off indicated by an upper control system, the voltage value FAULTN of the fault pin may maintain logic low for 100 μs (refer to FIG. 1) (100 μs done=1).

After a period in which the voltage value FAULTN of the fault pin is maintained at logic low for 100 μs (not limited thereto, 100 μs done=1), the PMIC 110 checks statuses of the PMICs 120 and 130 (e.g., whether an SPMI interface circuit is initialized). When a status check result indicates that a status error occurs (Status error), the power on reset may be performed on the corresponding PMIC 120 and/or 130 (S302).

When the status check result indicates that a status error does not occur (Status_ok=1), the PMIC 110 may control the PMICs 120 and 130 such that the DC-DC converters and regulators of the PMICs 120 and 130 are powered off in a predetermined order (S323). The PMIC 110 may transmit boot count values (i.e., an off group value) to the PMICs 120 and 130 by using the group ID GSID through the SPMI communication. The PMIC 110 may check whether the DC-DC converters and regulators of the PMICs 120 and 130 are normally powered off, by comparing the previously transmitted boot count value and a counting value of a counter of each of the PMICs 120 and 130.

When a result of comparing a boot count value and an actual counting value indicates that an abnormal situation does not occur, the power off sequence is successfully terminated; if not (nack: Boot_count_zero=1), the power on reset may be performed on a relevant PMIC (S302).

Numerical values, which are mentioned in the above example embodiments, such as a detailed time and the detailed number of times do not limit the present disclosure and are merely provided as an example. Numerical values/values, which are disclosed in the specification, such as a detailed time and the detailed number of times may be appropriately modified.

According to the example embodiments described above, communication may be performed between PMICs during the power on sequence and/or the power off sequence by using one dedicated pin (i.e., a fault pin) and one common pin (i.e., an SPMI pin). According to example embodiments, because the communication between PMICs is performed by using only two types of pins without a separate additional dedicated pin, area loss and power loss due to a separate additional dedicated pin may be prevented.

According to an example embodiment, stable voltages may be provided to an electronic device including a plurality of power management integrated circuits, by synchronizing power rails of the plurality of power management integrated circuits by using SPMI communication during an operation of the electronic device.

According to the present disclosure, because the communication between the power management integrated circuits is provided by using one dedicated pin and one common pin during a power on sequence and/or a power off sequence, a separate additional dedicated pin is not required.

In addition, because only one dedicated pin is used, area loss and power loss due to a separate additional dedicated pin may be prevented.

At least one of the components, elements, modules or units (collectively "components" in this paragraph) represented by a block in the drawings may be embodied as various numbers of hardware, software and/or firmware structures that execute respective functions described above, according to an example embodiment. These components may include, for example, the image processing block 1100, the communication block 1200, the audio processing block 1300, the buffer memory 1400, the nonvolatile memory 1500, the user interface 1600, the main processor 1800, the power managing device 1900, and the charger circuit 1910, as well as the components thereof, shown in FIGS. 2, 3, 5-7, 11 and 13, not being limited thereto. At least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components.

While aspects of example embodiments have been described, it will be apparent to those of ordinary skill in the art that various changes and modifications may be made thereto without departing from the following claims.

What is claimed is:

1. An electronic device comprising:
a first power management integrated circuit (PMIC) comprising a first fault controller connected to a first node, and a first interface circuit connected to a second node;
a second PMIC comprising a second fault controller connected to the first node, and a second interface circuit connected to the second node; and
a third PMIC comprising a third fault controller connected to the first node, and a third interface circuit connected to the second node,
wherein the first fault controller is configured to, during a power on sequence or a power off sequence, detect a change in a voltage level of the first node, and the first interface circuit is configured to communicate with any one or any combination of the second interface circuit and the third interface circuit based on the change in the voltage level of the first node.

2. The electronic device of claim 1, wherein the first interface circuit is further configured to, during the power on sequence, transmit a band gap reference enable signal to the second interface circuit and the third interface circuit by using a group ID indicating any one or any combination of the second PMIC and the third PMIC.

3. The electronic device of claim 1, wherein the second PMIC comprises a second status register configured to store a second status value of the second PMIC,
wherein the third PMIC comprises a third status register configured to store a third status value of the third PMIC,
wherein the first interface circuit is configured to check the second status value by using a second unique ID of the second PMIC, and
wherein the first interface circuit is configured to check the third status value by using a third unique ID of the third PMIC.

4. The electronic device of claim 1, wherein the first PMIC is configured to, during the power on sequence, sequentially power on second power rails of the second PMIC and third power rails of the third PMIC by using a group ID indicating any one or any combination of the second PMIC and the third PMIC.

5. The electronic device of claim 4, wherein the first interface circuit is configured to sequentially transmit boot count values to the second PMIC and the third PMIC by using the group ID,
wherein the second PMIC is configured to sequentially power on the second power rails of the second PMIC, which correspond to the boot count values, and
wherein the third PMIC is configured to sequentially power on the third power rails of the third PMIC, which correspond to the boot count values.

6. The electronic device of claim 5, wherein the second PMIC is configured to store a second value of indicating a second counted number of the second power rails that have been powered on, and
wherein the third PMIC is configured to store a third value indicated a third counted number of the third power rails that have been powered on.

7. The electronic device of claim 6, wherein the first interface circuit is configured to read the second value stored in the second PMIC to check whether the second PMIC is powered on, and
wherein the first interface circuit is configured to read the third value stored in the third PMIC to check whether the third PMIC is powered on.

8. The electronic device of claim 1, wherein the first fault controller comprises:

a first transistor configured to ground the first node based on a first fault driving voltage;

a first amplifier configured to amplify a voltage value of the first node; and a switch configured to provide an input voltage to the first node based on a pull-up enable signal.

9. The electronic device of claim 8, wherein the second fault controller comprises:

a second transistor configured to ground the first node based on a second fault driving voltage; and a second amplifier configured to amplify the voltage value of the first node, and wherein the third fault controller comprises:

a third transistor configured to ground the first node based on a third fault driving voltage; and a third amplifier configured to amplify the voltage value of the first node.

10. The electronic device of claim 1, wherein the first interface circuit and the second interface circuit are configured to operate based on a system power management interface (SPMI) protocol.

11. An electronic device comprising:

a first power management integrated circuit (PMIC) comprising a first fault controller connected to a first node, and a first interface circuit connected to a second node;

a second PMIC comprising a second fault controller connected to the first node, and a second interface circuit connected to the second node; and a main processor comprising a main interface circuit connected to the first node, wherein the first interface circuit is configured to, during a power on sequence or a power off sequence, communicate with the second interface circuit, and wherein the main interface circuit is configured to, in a period between the power on sequence and the power off sequence, communicate with the first interface circuit and the second interface circuit.

12. The electronic device of claim 11, wherein the first fault controller is configured to identify, during the power on sequence or the power off sequence, a change in a voltage level of the first node, and the first interface circuit is configured to communicate with the second interface circuit based on the change in the voltage level of the first node.

13. The electronic device of claim 11, further comprising:

a third PMIC comprising a third fault controller connected to the first node, and a third interface circuit connected to the second node.

14. The electronic device of claim 13, wherein the second PMIC comprises a second status register configured to store a second status value of the second PMIC, wherein the third PMIC comprises a third status register configured to store a third status value of the third PMIC, wherein the first interface circuit is configured to check the second status value by using a second unique ID of the second PMIC, and wherein the first interface circuit is configured to check the third status value by using a third unique ID of the third PMIC.

15. The electronic device of claim 13, wherein the first PMIC is configured to, during the power on sequence, sequentially power on second power rails of the second PMIC and third power rails of the third PMIC by using a group ID indicating any one or any combination of the second PMIC and the third PMIC.

16. The electronic device of claim 15, wherein the first interface circuit is configured to sequentially transmit boot count values to the second PMIC and the third PMIC by using the group ID, wherein the second PMIC is configured to sequentially power on the second power rails, which correspond to the boot count values, and wherein the third PMIC is configured to sequentially power on the third power rails, which correspond to the boot count values.

17. A method of operating an electronic device which includes a first power management integrated circuit (PMIC) connected to a node, a second PMIC connected to the node, and a main processor connected to the node, the method comprising:

checking, by the first PMIC, a voltage level of the node;

communicating, by the first PMIC, with the second PMIC based on a change in the voltage level of the node, the communicating being based on a system power management interface (SPMI) protocol; and sequentially powering on first power rails of the first PMIC and second power rails of the second PMIC based on the communicating.

18. The method of claim 17, wherein the communicating comprises:

transmitting, by the first PMIC, a band gap reference enable signal to the second PMIC by using a group ID indicating the second PMIC.

19. The method of claim 18, wherein the communicating comprises:

checking, by the first PMIC, a status of the second PMIC by using a unique ID of the second PMIC.

20. The method of claim 17, further comprising, after a power on sequence is terminated:

interrupting, by the first PMIC, the SPMI protocol-based communication between the first PMIC and the second PMIC;

communicating, by the main processor, with the first PMIC through the node using the SPMI protocol; and communicating, by the main processor, with the second PMIC through the node using the SPMI protocol.

* * * * *